(12) United States Patent
Xue et al.

(10) Patent No.: US 11,419,115 B2
(45) Date of Patent: Aug. 16, 2022

(54) METHOD AND APPARATUS OF DATA TRANSMISSION IN NEXT GENERATION CELLULAR NETWORKS

(71) Applicant: Samsung Electronics Co., Ltd., Suwon-si (KR)

(72) Inventors: Peng Xue, Suwon-si (KR); Hyunseok Ryu, Yongin-si (KR); Anil Agiwal, Suwon-si (KR); Namjeong Lee, Suwon-si (KR); Cheol Jeong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/826,933

(22) Filed: Mar. 23, 2020

(65) Prior Publication Data

US 2020/0229190 A1 Jul. 16, 2020

Related U.S. Application Data

(63) Continuation of application No. 15/675,118, filed on Aug. 11, 2017, now Pat. No. 10,602,516.

(Continued)

(51) Int. Cl.
*H04W 72/04* (2009.01)
*H04L 5/00* (2006.01)
*H04B 1/715* (2011.01)

(52) U.S. Cl.
CPC ....... *H04W 72/0453* (2013.01); *H04L 5/0035* (2013.01); *H04L 5/0044* (2013.01);
(Continued)

(58) Field of Classification Search
CPC .......... H04W 72/0453; H04W 72/042; H04W 72/1273; H04W 72/1289; H04L 5/0094;
(Continued)

(56) References Cited

U.S. PATENT DOCUMENTS 9,955,465 B2 * 4/2018 He .................. H04L 5/0044
10,205,575 B2 2/2019 Han et al.
(Continued)

FOREIGN PATENT DOCUMENTS

CN 102315897 A 1/2012
CN 103959872 A * 7/2014 .......... H04W 72/042
(Continued)

OTHER PUBLICATIONS

International Search Report dated Oct. 27, 2017, issued in the International Application No. PCT/KR2017/008802 dated Aug. 11, 2017.

(Continued)

*Primary Examiner* — Jay P Patel
(74) *Attorney, Agent, or Firm* — Jefferson IP Law, LLP

(57) ABSTRACT

A communication method and system for converging a $5^{th}$-Generation (5G) communication system for supporting higher data rates beyond a $4^{th}$-Generation (4G) system with a technology for Internet of Things (IoT) are provided. The communication method and system may be applied to intelligent services based on the 5G communication technology and the IoT-related technology, such as smart home, smart building, smart city, smart car, connected car, health care, digital education, smart retail, security and safety services. A method of a user equipment (UE) for receiving data is provided. The method includes receiving, from a base station, information on radio resources allocated to the UE, and receiving, from the base station, data based on the information on the radio resources. The radio resources are associated with a plurality of symbols in a time domain and a plurality of resource block groups in a frequency domain. The information on the radio resources includes at least one of first information on a starting symbol, or second information on a size of each of the resource block groups.

12 Claims, 40 Drawing Sheets

Related U.S. Application Data

(60) Provisional application No. 62/501,265, filed on May 4, 2017, provisional application No. 62/373,655, filed on Aug. 11, 2016.

(52) U.S. Cl.
CPC .......... *H04L 5/0053* (2013.01); *H04L 5/0058* (2013.01); *H04L 5/0094* (2013.01); *H04W 72/042* (2013.01); *H04B 1/715* (2013.01)

(58) Field of Classification Search
CPC ... H04L 5/0044; H04L 5/0058; H04L 5/0053; H04L 5/0035; H04B 1/715
See application file for complete search history.

(56) References Cited

U.S. PATENT DOCUMENTS

| | | | |
|---|---|---|---|
| 10,891,567 B2* | 1/2021 | Morgenthau | H04W 72/0453 |
| 2005/0101330 A1 | 5/2005 | Chang et al. | |
| 2007/0259672 A1 | 11/2007 | Heo et al. | |
| 2008/0049690 A1 | 2/2008 | Kuchibhotla et al. | |
| 2009/0125650 A1* | 5/2009 | Sebire | H04W 28/0278 710/57 |
| 2010/0113373 A1 | 5/2010 | Phillips et al. | |
| 2010/0165847 A1 | 7/2010 | Kamuf et al. | |
| 2010/0215002 A1 | 8/2010 | Kim et al. | |
| 2011/0044233 A1 | 2/2011 | Cho et al. | |
| 2012/0099519 A1 | 4/2012 | Kim et al. | |
| 2012/0320837 A1 | 12/2012 | Kim et al. | |
| 2013/0083753 A1 | 4/2013 | Lee et al. | |
| 2013/0343215 A1 | 12/2013 | Li et al. | |
| 2014/0036806 A1 | 2/2014 | Chen et al. | |
| 2014/0064174 A1 | 3/2014 | Abe et al. | |
| 2014/0126506 A1* | 5/2014 | Horiuchi | H04L 5/0048 370/329 |
| 2014/0146799 A1 | 5/2014 | Park et al. | |
| 2014/0153539 A1 | 6/2014 | Seo et al. | |
| 2014/0177578 A1 | 6/2014 | Dinan | |
| 2014/0334397 A1 | 11/2014 | Chen et al. | |
| 2015/0023231 A1 | 1/2015 | Ji et al. | |
| 2015/0215916 A1 | 7/2015 | Chen et al. | |
| 2015/0256316 A1 | 9/2015 | Seo et al. | |
| 2015/0305058 A1 | 10/2015 | Hammarwall et al. | |
| 2016/0021661 A1* | 1/2016 | Yerramalli | H04W 16/14 370/329 |
| 2016/0100382 A1* | 4/2016 | He | H04L 5/001 370/329 |
| 2016/0143008 A1 | 5/2016 | Lee et al. | |
| 2016/0174238 A1 | 6/2016 | Chen et al. | |
| 2017/0105206 A1 | 4/2017 | Maattanen et al. | |
| 2017/0207887 A1* | 7/2017 | Horiuchi | H04L 5/0048 |
| 2017/0223677 A1 | 8/2017 | Dinan et al. | |
| 2017/0289818 A1 | 10/2017 | Ng et al. | |
| 2017/0374569 A1 | 12/2017 | Lee et al. | |
| 2018/0049166 A1* | 2/2018 | Sun | H04L 5/0092 |
| 2018/0227838 A1 | 8/2018 | Hayashi et al. | |
| 2018/0310280 A1* | 10/2018 | Byun | H04W 72/042 |
| 2018/0376495 A1 | 12/2018 | Lee et al. | |
| 2019/0159191 A1 | 5/2019 | Kim et al. | |

FOREIGN PATENT DOCUMENTS

| | | | | |
|---|---|---|---|---|
| CN | 103973397 A | | 8/2014 | |
| CN | 103988563 A | * | 8/2014 | ........ H04W 72/1263 |
| CN | 105379167 A | | 3/2016 | |
| EP | 2448146 A2 | | 5/2012 | |
| EP | 2737675 A2 | | 6/2014 | |
| EP | 3202073 B1 | * | 2/2019 | ............ H04L 5/001 |
| GN | 104427494 A | | 3/2015 | |
| GN | 104488217 A | | 4/2015 | |
| WO | 2010/053984 A2 | | 5/2010 | |
| WO | WO-2011159132 A2 | * | 12/2011 | ........ H03M 13/3723 |
| WO | WO 2013/029419 | * | 3/2013 | ............ H04W 72/04 |
| WO | WO-2013029419 A1 | * | 3/2013 | ............ H04W 72/04 |
| WO | WO-2014067149 A1 | * | 5/2014 | ........... H04L 5/0092 |
| WO | WO-2016053450 A1 | * | 4/2016 | ............ H04L 5/001 |
| WO | WO-2016056876 A1 | * | 4/2016 | ............ H04L 5/001 |

OTHER PUBLICATIONS

Extended European Search Report dated Jun. 24, 2019, issued in a counterpart European application No. 17839881.4-1219/ 3482596.

LG-NORTEL: "Control Channel Design for Relay Backhaul Link in FDM-hTDM Scheme", 3GPP Draft; R1-094453, 3rd Generation Partnership Project (3GPP), Mobile Competence Centre; Nov. 9, 2009 650, Route des Lucioles; F-06921 Sophia-Antipolis Cedex; France, No. Jeju.

Chinese Office Action dated Dec. 28, 2020, issued in a counterpart Chinese Application No. 201780049185.7.

Extended European Search Report dated Nov. 24, 2021, issued in a counterpart European Application No. 21193313.0-1205.

Guangdong Oppo Mobile Telecom: "Bandwidth part configuration and frequency resource allocation", 3GPP Draft; RI-1710164, 3rd Generation Partnership Project (3GPP), Mobile Competence Centre 350, Route Des Lucioles ; F-06921 Sophia-Anti Polis Cedex; France, vol. RAN WGl, No. XP051304243; Jun. 16, 2017, Qingdao, P.R. China.

Nterdigital et al: "On frequency-domain resource allocation for NR", 3GPP Draft; R1-1710953, 3RD Generation Partnership Project (3GPP), Mobile Competence Centre; 650, Route Des Lucioles ; F-06921 Sophia-Antipolis Cedex; France, vol. RAN WG1, No. XP051304584 Jun. 16, 2017, Oingdao, P.R. China.

LG Electronics: "Discussion on frequency-domain resource allocation", 3GPP Draft; R1-1710323, 3RD Generation Partnership Project (3GPP), Mobile F Competence Centre; 650, Route Des Lucioles; F-06921 Sophia-Antipolis Cedex; France, vol. Ran WG1, No. XP051304954; Jun. 17, 2017, Oingdao, P.R. China.

* cited by examiner

METHOD AND APPARATUS OF DATA TRANSMISSION IN NEXT GENERATION CELLULAR NETWORKS

CROSS-REFERENCE TO RELATED APPLICATION(S)

This application is a continuation application of prior Application Ser. No. 15/675,118, filed on Aug. 11, 2017, which issues as U.S. Pat. No. 10,602,516 on Mar. 24, 2020, which claims the benefit under 35 U.S.C. § 119(e) of a U.S. Provisional patent application filed on Aug. 11, 2016 in the U.S. Patent and Trademark Office and assigned Ser. No. 62/373,655, and of a U.S. Provisional patent application filed on May 4, 2017 in the U.S. Patent and Trademark Office and assigned Ser. No. 62/501,265, the entire disclosure of each of which is hereby incorporated by reference.

TECHNICAL FIELD

The present disclosure relates to a method and an apparatus for data transmission. More particularly, the present disclosure relates to a resource configuration and a scheduling method in next generation cellular networks.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, and large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

In the recent years several broadband wireless technologies have been developed to meet the growing number of broadband subscribers and to provide more and better applications and services. The second generation (2G) wireless communication system has been developed to provide voice services while ensuring the mobility of users. The third generation (3G) wireless communication system supports not only the voice service but also data service. The 4G wireless communication system has been developed to provide high-speed data service. However, the 4G wireless communication system currently suffers from lack of resources to meet the growing demand for high speed data services. Therefore, the 5G wireless communication system is being developed to meet the growing demand of various services with diverse requirements, e.g., high speed data services, ultra-reliability and low latency applications and massive machine type communication. The spectrum utilization efficiency needs to be improved. There is high potential that various services are to be supported in a single 5G cellular network, and hence flexible multiplexing of multiple services is necessary. In addition, the system design should consider forward compatibility to smoothly add new services in the future.

FIG. 1 shows an example of resource allocation in LTE systems according to the related art. In the cellular networks, the system design usually has limited flexibility on resource allocations. Take the 4G LTE system as one example; the resources assigned for downlink and uplink data transmission are usually a number of physical resource blocks (PRBs) pairs as a baseline, which occupies one subframe in the time domain and several contiguous or non-contiguous PRBs in the frequency domain, as shown in FIG. 1. There is limitation of the current schemes to support various resource allocation scenarios in the 5G networks. For example, it is beneficial to allow data transmission re-use some of the unused control regions to improve spectrum utilization efficiency. In addition, there is a need to support multiplexing different services or user equipments (UEs) in a time division multiplexing (TDM) manner within a transmission time interval (TTI) or subframe. The symbols in a TTI or subframe are not all allocated to a UE in some scenarios. However, no resource allocation protocol has been specified. In this disclosure, the methods of flexible resource allocations for the future cellular networks, e.g., LTE-advanced (LTE-A) or 5G, is disclosed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a communication method and system for converging a $5^{th}$-Generation (5G) communication system for supporting higher data rates beyond a $4^{th}$-Generation (4G) system.

In accordance with a first aspect of the present disclosure, a method of a user equipment (UE) for receiving data is provided. The method includes receiving, from a base station, information on radio resources allocated to the UE, and receiving, from the base station, data based on the information on the radio resources. The radio resources are associated with a plurality of symbols in a time domain and a plurality of resource block groups in a frequency domain. The information on the radio resources includes at least one of first information on a starting symbol, or second information on a size of each of the resource block groups.

In accordance with a second aspect of the present disclosure, a user equipment (UE) including a transceiver and at least one processor is provided. The transceiver is configured to receive signals from a base station and transmit signals to the base station. The at least one processor is configured to control the transceiver to receive, from the base station, information on radio resources allocated to the UE, and control the transceiver to receive, from the base station, data based on the information on the radio resources. The radio resources are associated with a plurality of symbols in a time domain and a plurality of resource block groups in a frequency domain. The information on the radio resources includes at least one of first information on a starting symbol, or second information on a size of each of the resource block groups.

In accordance with a third aspect of the present disclosure, a method of a base station for transmitting data is provided. The method includes transmitting, to a user equipment (UE), information on radio resources allocated to the UE, and transmitting, to the UE, data based on the information on the radio resources. The radio resources are associated with a plurality of symbols in a time domain and a plurality of resource block groups in a frequency domain. The information on the radio resources includes at least one of first information on a starting symbol, or second information on a size of each of the resource block groups.

In accordance with a fourth aspect of the present disclosure, a base station including a transceiver and at least one processor is provided. The transceiver is configured to receive signals from a user equipment (UE) and transmit signals to the UE. The at least one processor is configured to control the transceiver to transmit, to the UE, information on radio resources allocated to the UE, and control the transceiver to transmit, to the UE, data based on the information on the radio resources. The radio resources are associated with a plurality of symbols in a time domain and a plurality of resource block groups in a frequency domain. The information on the radio resources includes at least one of first information on a starting symbol, or second information on a size of each of the resource block groups.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
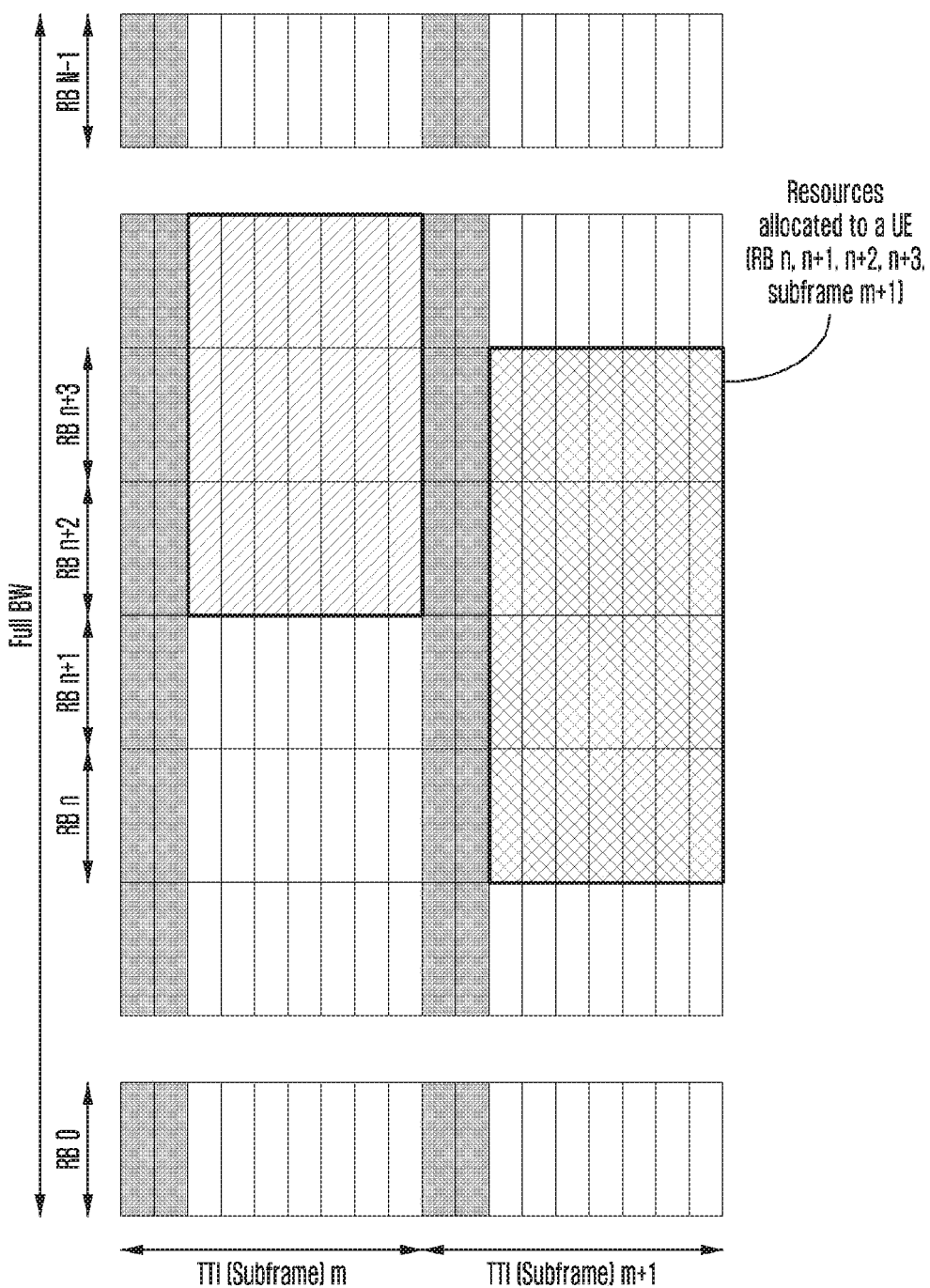
FIG. 1 illustrates shows an example of resource allocation in LTE systems according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out steps of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

FIG. 1 shows an example of resource allocation in LTE systems according to the related art.

Figure 2:
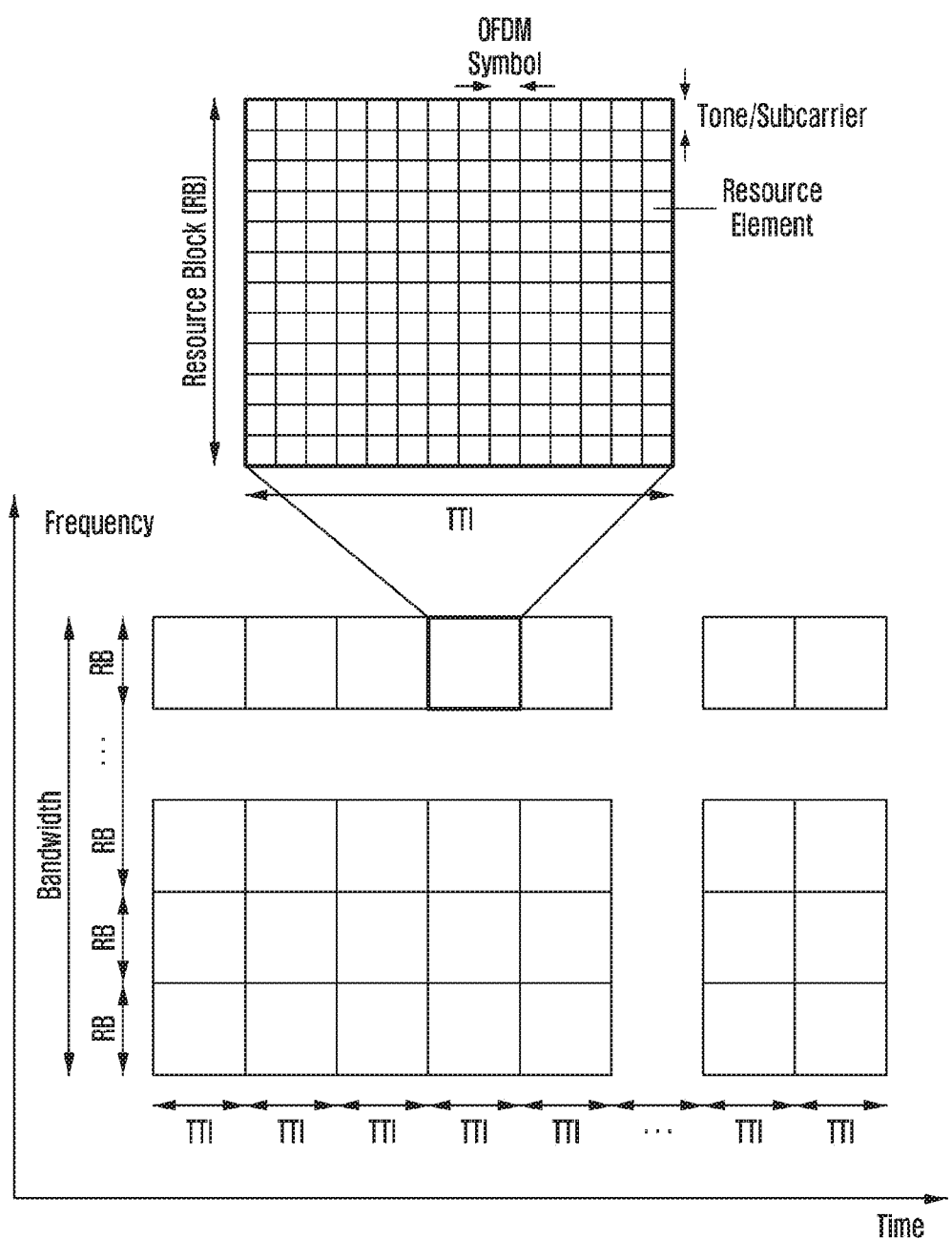
FIG. 2 illustrates an example of resource grid according to an embodiment of the present disclosure.

FIG. 2 illustrates an example of resource grid according to an embodiment of the present disclosure.

Referring to FIG. 2, considering an orthogonal frequency division multiplexing (OFDM) based communication system, a resource element can be defined by a subcarrier during on OFDM symbol duration. In the time domain, a transmission time interval (TTI) can be defined which is composed of multiple OFDM symbols. In the frequency domain, a resource block (RB) can be defined which is composed of multiple OFDM subcarriers.

As shown in FIG. 2, the resources can be divided into TTIs in time domain and RBs in frequency domain. Typically, a RB can be a baseline resource unit for scheduling in the frequency domain, and a TTI can be a baseline resource unit for scheduling the time domain. However, depending on different service features and system requirements, there can be other options.

1) Semi-Static Resource Configuration

To support multiplexing of different services, a base station (BS) of the next generation radio network (gNodeB (NB)) or a new radio (NR), can semi-statically pre-configure some resources for different services. To support forward compatibility, it is also possible to pre-configure some resource for the services to be supported in the future. For example, when the network is to be coexisted with other networks such as long term evolution (LTE), the reserved resource for LTE can be static. Based on the performance requirement and traffic feature of a certain service, the BS (or gNB) decides how to pre-configure the resources in an efficient and flexible manner. The resource configurations can be signaled in the system information of a cell.

Time Domain Resource Configuration

Figure 3:
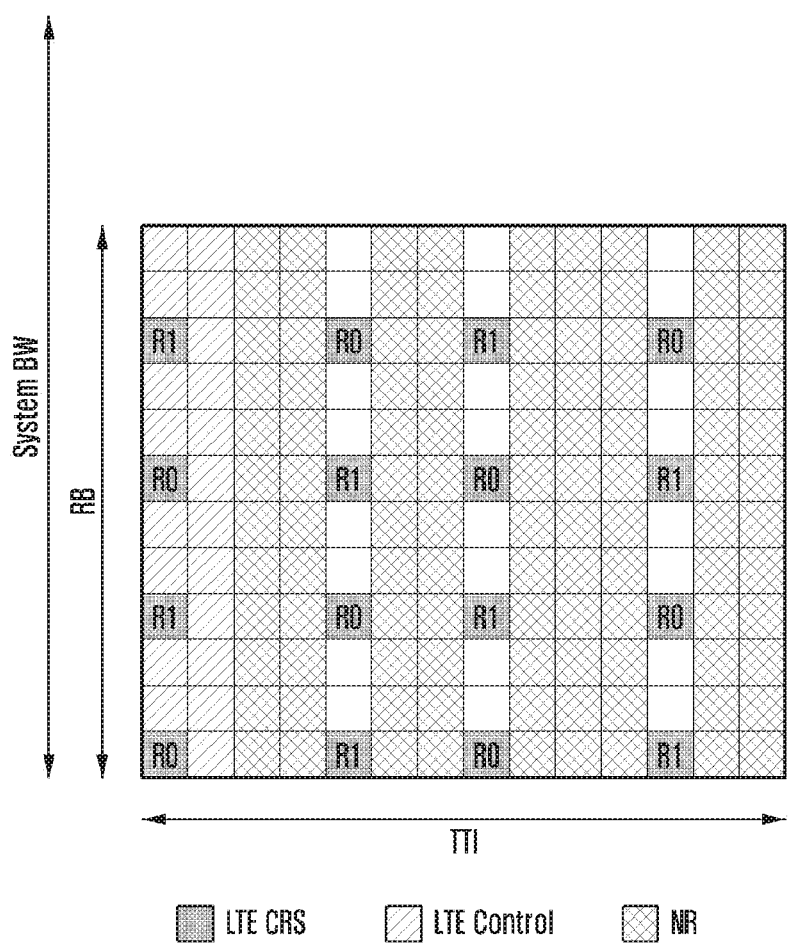
FIG. 3 illustrates an example of resource sharing in a TTI for NR/LTE coexisting scenario according to an embodiment of the present disclosure.

FIG. 3 illustrates an example of resource sharing in a TTI for NR/LTE coexisting scenario according to an embodiment of the present disclosure.

Referring to FIG. 3, to support some service with low latency requirement, partial symbols in a TTI can be reserved in a periodic manner. Or, to reserve some resources for other networks/services, e.g., when coexisting with other networks such as LTE, the reserved resources can be static and may have a pre-defined pattern. For example, when coexisting with LTE, and if a TTI has 14 symbols which is same as LTE, some symbols in a TTI can be reserved for LTE control region and cell-specific reference signal (CRS) symbols, since these channels/signals are always transmitted in LTE.

As shown in the example of FIG. 3, during one TTI, 5 symbols can be reserved for LTE, including the first 2 symbols for LTE control region and 3 other symbols for CRS symbols. The other 9 symbols in one TTI can be used for NR. The resources can be configured based on the combinations of TTI allocation and symbol assignment.

Figure 4:
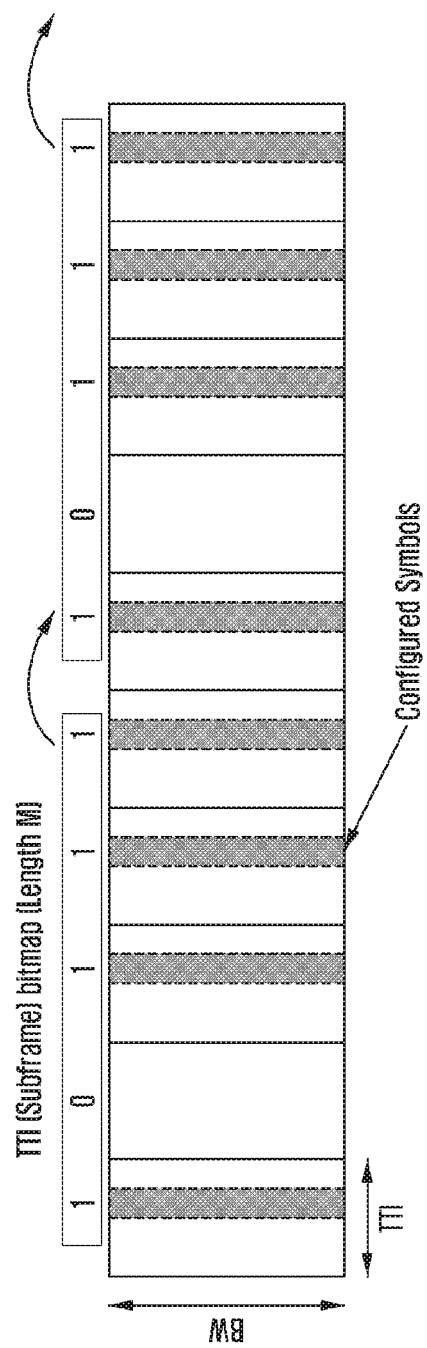
FIG. 4 illustrates an example of resource reservation/configuration based on TTI bitmap and symbol indication according to an embodiment of the present disclosure.

FIG. 4 illustrates an example of resource reservation/configuration based on TTI bitmap and symbol indication according to an embodiment of the present disclosure.

Referring to FIG. 4, the TTI allocation indicates the TTI (e.g., subframe) to be allocated for the corresponding services, which can be derived based on a TTI bitmap with a pre-defined length M. The bitmap can be applied to every M TTIs to derive the allocated TTIs, as shown in FIG. 4. If there is no TTI bitmap, it can be assumed that the symbol reservation/configuration is applied to every TTI. The time resources can be configured based on one or more sets of combined TTI allocation and symbol assignment.

The symbol assignment indicates the symbols in the corresponding allocated TTIs. Assuming that there are N symbols in the given TTI duration, multiple signaling options can be used to indicate the assigned symbols.

Embodiment 1: Symbol Bitmap

Figure 5:
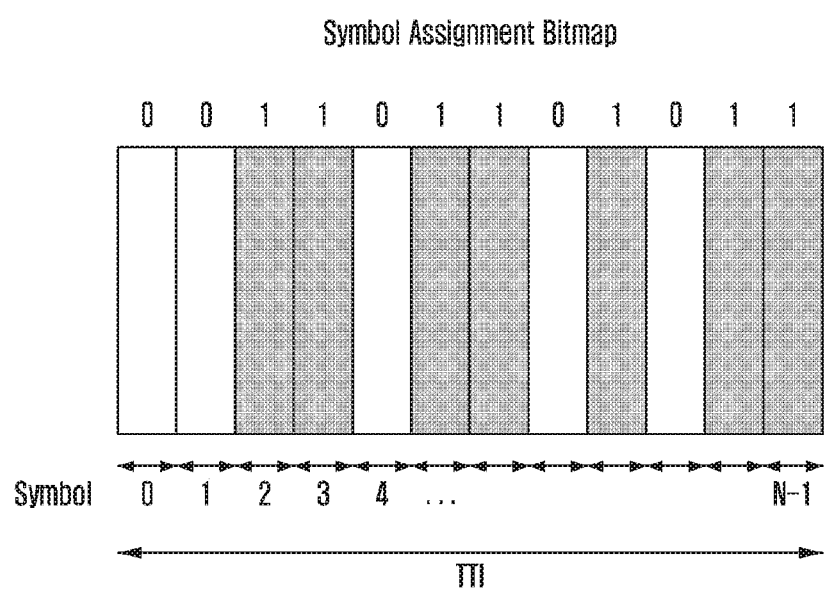
FIG. 5 illustrates an example of configuration based on symbol bitmap indication according to an embodiment of the present disclosure.

FIG. 5 illustrates an example of configuration based on symbol bitmap indication according to an embodiment of the present disclosure.

Referring to FIG. 5, if there are N symbols in the given TTI duration, a bitmap $\{b_0, b_1, \ldots, b_n, b_{n+1}, \ldots, b_{N-1}\}$ with length of N can be used to explicitly indicate if the n-th symbol is allocated or not, e.g., by setting $b_n=1$ or 0. This requires N bits for indication of each symbol. For example, if N=14, an indication with 14 bits bitmap is required.

Embodiment 2: Start Symbol Index, End Symbol Index (or Number of Symbols)

Figure 6:
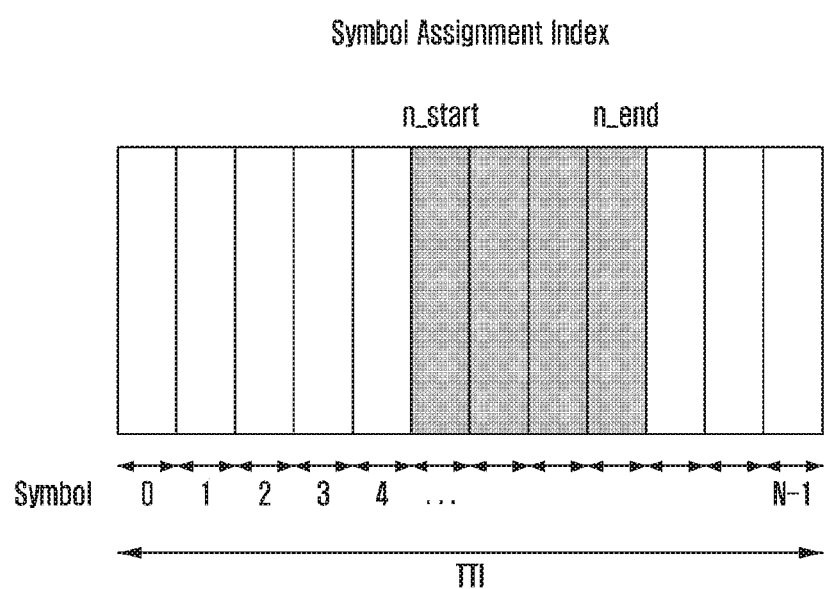
FIG. 6 illustrates an example of configuration based indication of start symbol and end symbol according to an embodiment of the present disclosure.

FIG. 6 illustrates an example of configuration based indication of start symbol and end symbol according to an embodiment of the present disclosure.

Referring to FIG. 6, if there are N symbols in the given TTI duration, an indication of $(n_{start}, n_{end})$ can be used to indicate that the symbols with index starting from $n_{start}$ to $n_{end}$ are allocated. Alternatively, an indication of $(n_{start}, n_{symbol})$ can be used to indicate that $n_{symbol}$ continuous symbols starting from $n_{start}$ are allocated, i.e., till to the symbol with index $(n_{start}+n_{symbol}-1)$. In other words, information on the starting symbol and the duration of the assigned continuous symbols can be signaled. This requires $2\lceil \log_2\lceil N \rceil \rceil$ bits for indication. For example, if N=14, an indication with 8 bits is required.

Embodiment 3: Indication of Continuously Allocated Symbols

Figure 7:
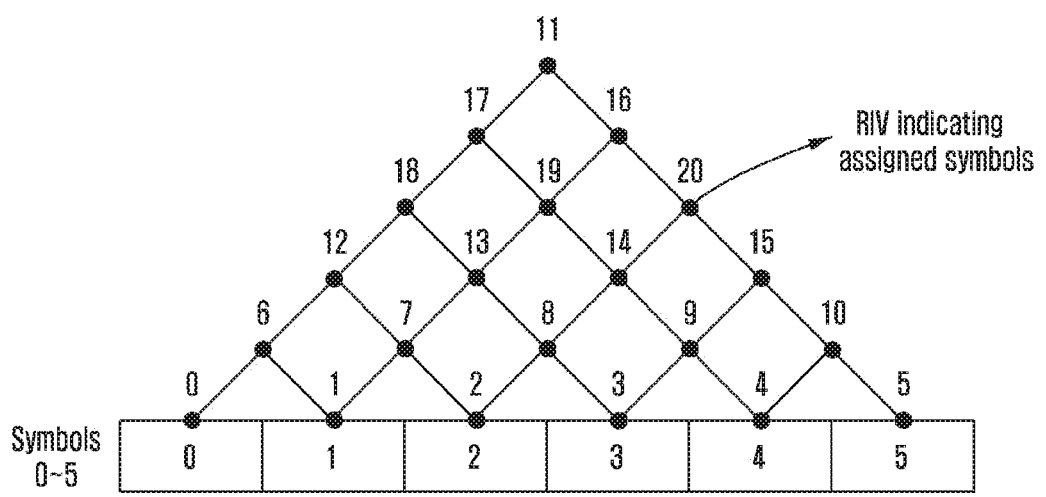
FIG. 7 illustrates an example of configuration based indication of continuously allocated symbols according to an embodiment of the present disclosure.

FIG. 7 illustrates an example of configuration based indication of continuously allocated symbols according to an embodiment of the present disclosure.

Referring FIG. 7, to further reduce the overhead, a tree based signaling method can be used for indication if continuous symbols are always assigned. A resource indication value (RIV) can be signaled, to derive the index of starting symbol $n_{start}$ and the number of assigned continuous symbols $n_{symbol}$. The relationship between RIV and $n_{start}/n_{symbol}$ can be expressed as follows:

$$\text{If } n_{symbol1} - 1 \leq \left\lfloor \frac{N}{2} \right\rfloor, \ RIV = N(n_{symbol1} - 1) + n_{start}$$

$$\text{Else } \left(\text{i.e., } n_{symbol1} - 1 > \left\lfloor \frac{N}{2} \right\rfloor\right),$$

$$RIV = N(N - n_{symbol1} + 1) + (N - 1 - n_{start})$$

This requires $$\left\lceil \log_2 \frac{N(N+1)}{2} \right\rceil$$

bits for indication. For example, if N=14, an indication with 7 bits is required. An example with N=6 case is shown in FIG. 7.

Frequency Domain Resource Configuration

To support some service with narrow bandwidth requirement, partial subcarriers in a RB can be reserved. The frequency resources can be configured based on the combinations of RB allocation and subcarrier assignment.

The RB allocation indicates the RBs to be allocated for the corresponding services. For example, this can be signaled by the index of the start RB and end RB, e.g., Start_RB_Index, End_RB_Index, which means the RBs with index from Start_RB_Index to End_RB_Index are allocated. Alternatively, this can be signaled by the start RB index and number of allocated RBs, e.g., Start_RB_Index, Num_RB, which means the RBs with index from Start_RB_Index to (Start_RB_Index+Num_RB-1) are allocated. The RB allocation schemes in LTE can be re-used.

The subcarrier assignment indicates the subcarriers in the corresponding allocated RBs. Assuming that there are K subcarriers in a RB, multiple signaling options can be used to indicate the assigned subcarriers.

Embodiment 1: Start Subcarrier Index in the 1st RB and End Subcarrier Index in the Last RB FIG. 8A illustrates an example of configuration of RBs/subcarriers in the frequency domain according to an embodiment of the present disclosure.

Figure 8A:
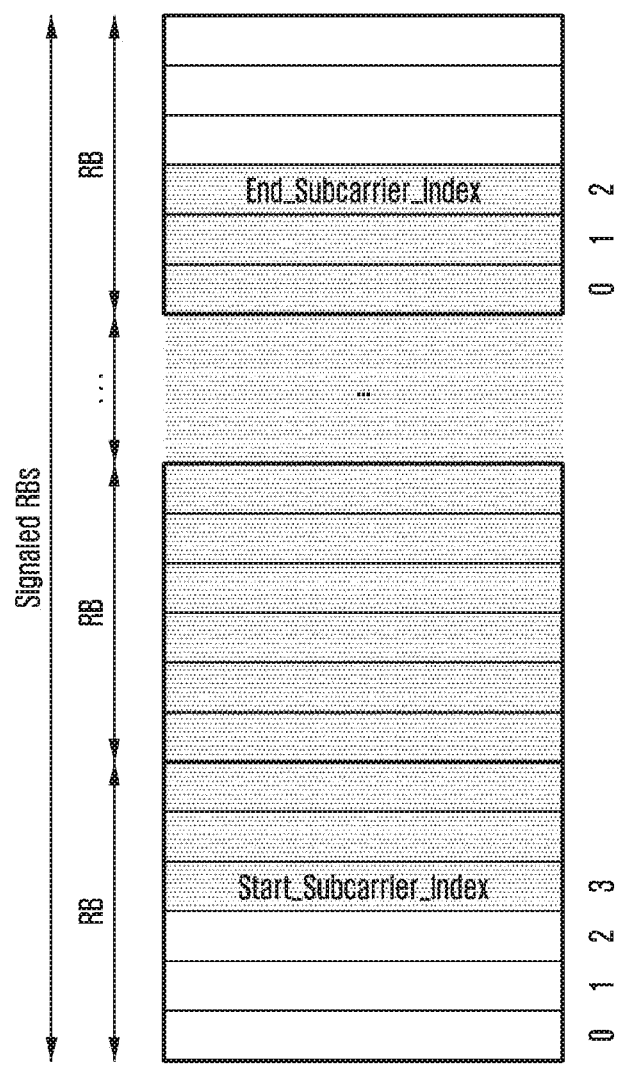
FIGS. 8A, 8B and 8C illustrate examples of configuration of RBs/subcarriers in the frequency domain according to various embodiments of the present disclosure.

Referring to FIG. 8A, on top of the signaled RB index, the Start_Subcarrier_Index and the End_Subcarrier_Index can be signaled. The Start_Subcarrier_Index indicates the start subcarrier index in the first allocated RB, and the End_Subcarrier_Index indicates the end subcarrier index in the last allocated RB, as shown in FIG. 8A. All subcarriers in the middle RBs are allocated.

Embodiment 2: Number of Subcarriers in the Edge RBs

Figure 8B:
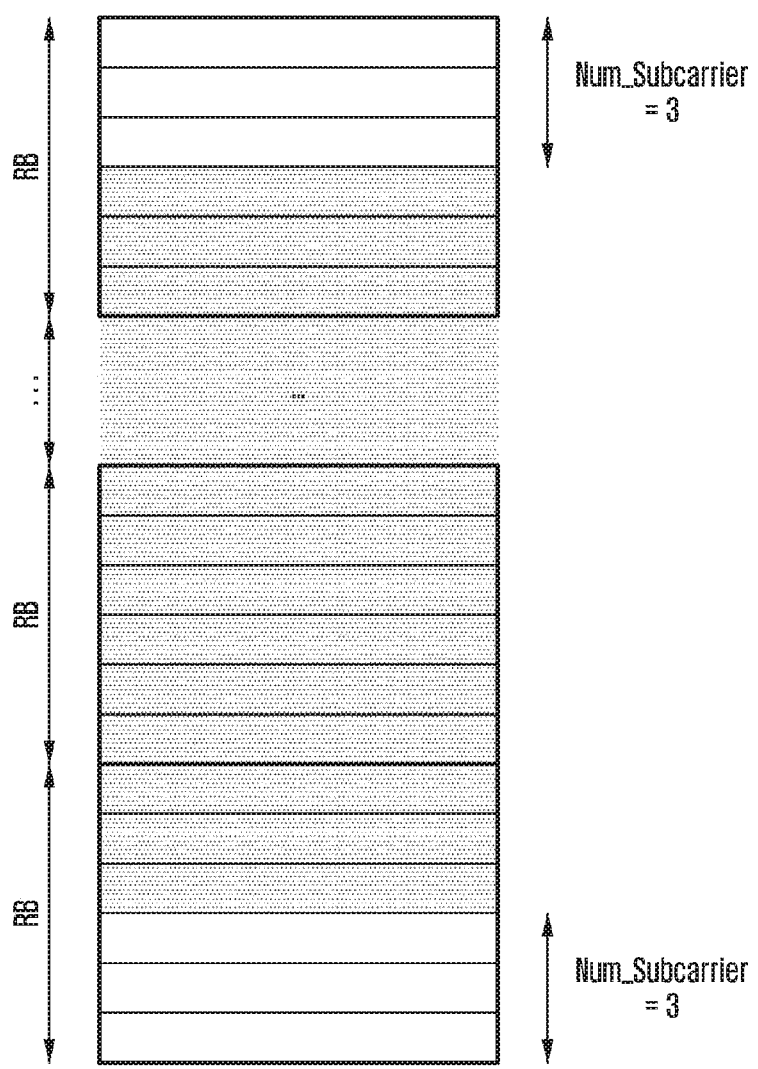

FIG. 8B illustrates another example of configuration of RBs/subcarriers in the frequency domain according to an embodiment of the present disclosure.

Referring to FIG. 8B, on top of the signaled RB index, the Num_Subcarrier can be signaled. The Num_Subcarrier indicates the number of subcarriers used in the edge RBs. For example, the last Num_Subcarrier subcarriers in the first allocated RB are assigned, and the first Num_Subcarrier subcarriers in the last allocated RB are assigned. All subcarriers in the middle RBs are allocated.

Alternatively, the Num_Subcarrier may indicate the number of non-allocated subcarriers in the edge RBs. For example, the first Num_Subcarrier subcarriers in the first allocated RB are not assigned, and the last Num_Subcarrier subcarriers in the last allocated RB are not assigned. All subcarriers in the middle RBs are allocated. FIG. 8B shows an example of this approach with Num_Subcarrier=3.

Embodiment 3: Number of Subcarriers in the Edge RBs

Figure 8C:
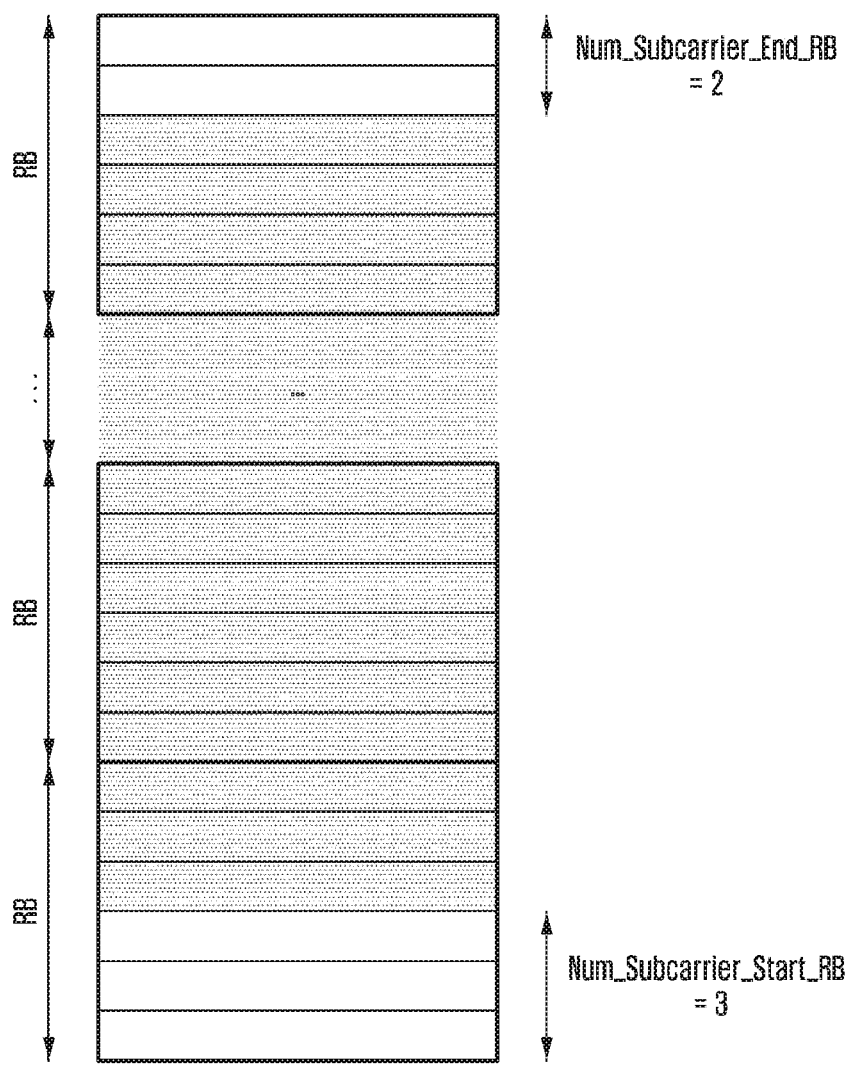

FIG. 8C illustrates another example of configuration of RBs/subcarriers in the frequency domain according to an embodiment of the present disclosure.

Referring to FIG. 8C, in Embodiment 2, it is assumed that the parameter Num_Subcarrier in the $1^{st}$ RB and last RB is the same. It is also possible that the parameter can be different, e.g., Num_Subcarrier_Start_PRB in the $1^{st}$ RB and Num_Subcarrier_End_PRB in the last RB. The parameter can indicate the number of assigned subcarriers or non-assigned subcarriers, similar as the case in Embodiment 2. An example is shown in FIG. 8C, with Num_Subcarrier-_Start_RB=3 and Num_Subcarrier_End_RB=2 denoting the number of non-assigned subcarriers in the $1^{st}$ RB and last RB, respectively.

Figure 9:
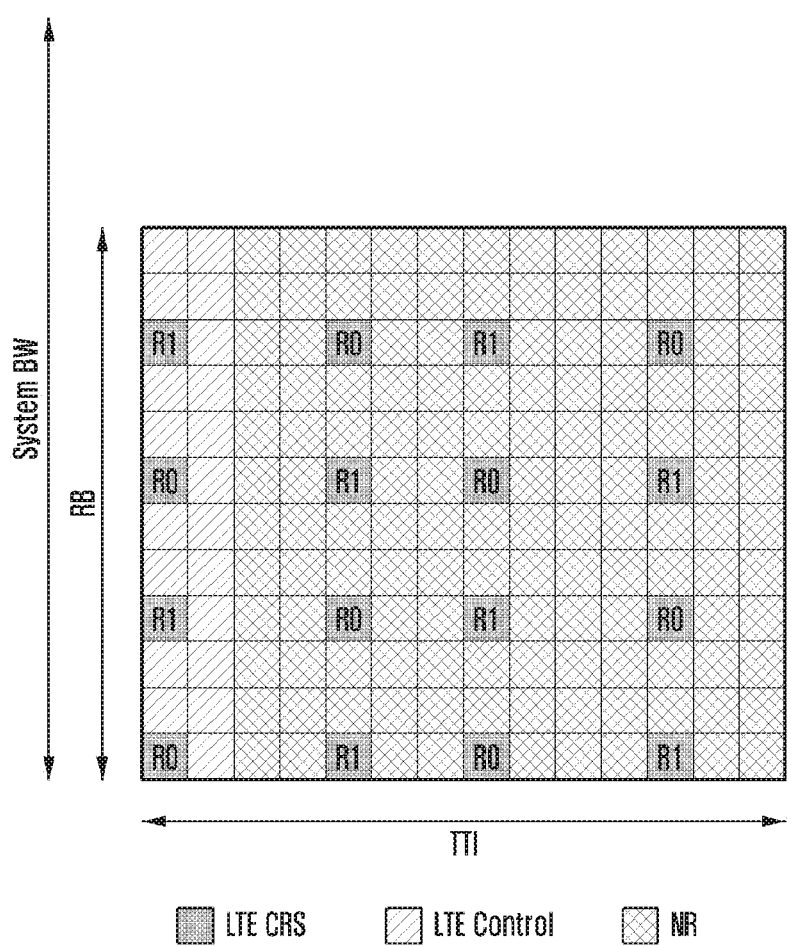
FIG. 9 illustrates an example of configuration of RBs/subcarriers in the NR/LTE coexisting scenario according to an embodiment of the present disclosure.

FIG. 9 illustrates an example of configuration of RBs/subcarriers in the NR/LTE coexisting scenario according to an embodiment of the present disclosure.

Referring to FIG. 9, in some cases, it is possible to only reserve some resource elements among the indicated RBs. For example, when coexisting with legacy LTE networks, some LTE signals, e.g., CRS can be reserved and not used by the current network. Assuming that there are K subcarriers in a RB, multiple signaling options can be used to indicate the reserved subcarriers.

Embodiment 1

A RE level bitmap can be used to indicated which REs are reserved and not be used.

Embodiment 2: Start RE Index and Interval within a RB

For example, a starting RE index is a, and an interval b, can indicate that the REs with index {a,a+b,a+2b, . . . } within K REs are reserved. In FIG. 9, a=0, b=3, and K=12, and in each RB the REs with index {0,3,6,9} are reserved for CRS and not used by NR transmission.

Time/Frequency Domain Resource Configuration

Figure 10:
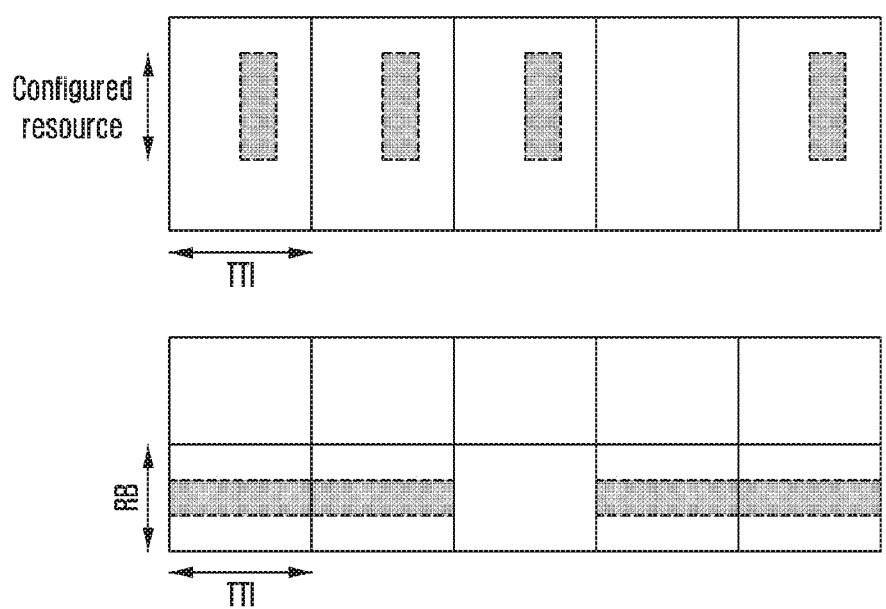
FIG. 10 illustrates a combination of time/frequency resource configuration/reservation according to an embodiment of the present disclosure.

FIG. 10 illustrates a combination of time/frequency resource configuration/reservation according to an embodiment of the present disclosure. It is possible that a certain service may not always occupy the resource in the whole frequency domain, or in the whole time domain. Therefore, the time domain and frequency domain resource configurations can be combined to indicate the pre-configured resource in a cell, as shown in FIG. 10. There can be one or multiple sets of resource configurations. The resource configurations can be signaled in the system information.

For the resources reserved for other services not operated by the current network, e.g., when coexisting with other systems or networks, the resources are not be used by the gNB and UEs accessing the current network. And the UEs assume that there are no signals or transmissions on the reserved resources in the current network. If the reserved resources are configured in the system information, all UEs in the cell may assume that the resources are not available. The configuration can be UE-specific via RRC signaling, i.e., gNB indicates a certain UE or group of UEs the configuration of the reserved resources and UEs assume that in configured resources are not available.

2) Dynamic Resource Configuration

After the UE is connected to the system, the UE can obtain the basic TTI information. The possible set of number of symbols in a TTI and numerologies can be pre-defined. The UE can be configured by a certain set of parameters, e.g., TTI duration 0 with N symbols in a configured numerology 0, TTI duration 1 with M symbols in a configured numerology 0, etc. The UE may assume that the frequency resources for data transmission or reception can be the full system bandwidth. Or, a frequency subband (or called a bandwidth part, BWP) can be configured to a UE for data transmission or reception. The configured frequency subband is smaller than or equal to the system bandwidth, as well as smaller than or equal to the UE bandwidth. There can be a configured numerology (e.g., subcarrier spacing, CP type, etc.) in the BWP. The control channels are transmitted in a control region, where the control resource set (CORESET) can be semi-statically configured in the system information or via UE-specific RRC signaling, e.g., M OFDM symbols including OFDM symbol {0, 1, . . . , M−1} in a certain frequency part which is less than or equal to the system bandwidth or configured BWP. One TTI duration can be a default interval to for UEs to monitor the CORESET, or a UE-specific CORESET monitoring interval can be configured. Within the configured CORESET, the PDCCH carrying downlink control indication (DCI) can be transmitted in the resources based on a pre-defined rule. The UE searches PDCCH to detect any valid DCIs for scheduling data transmissions/receptions based on monitoring interval.

Figure 11:
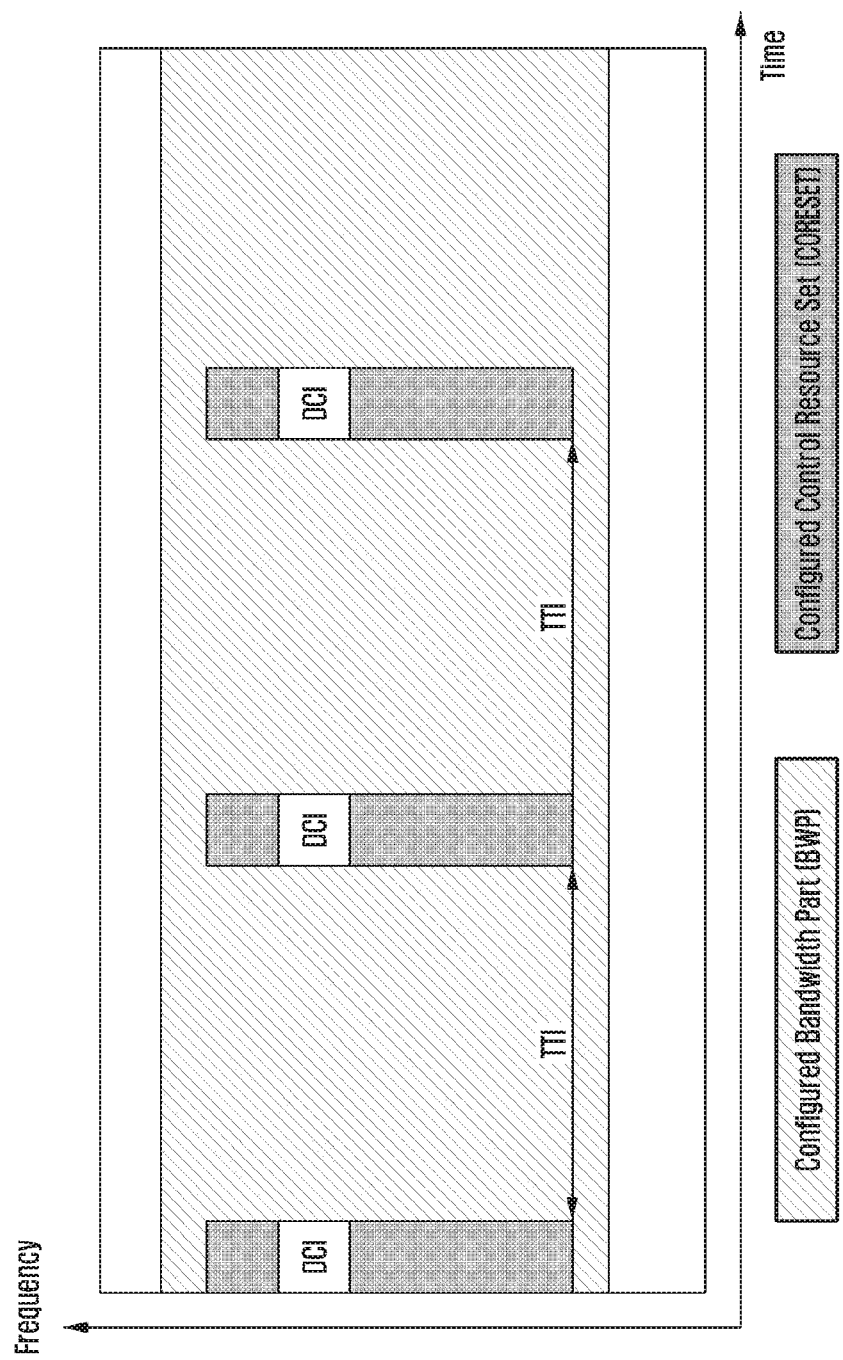
FIG. 11 illustrates an example of configured BWP and CORESET for DCI monitoring according to an embodiment of the present disclosure.

FIG. 11 illustrates an example of configured BWP and CORESET for DCI monitoring according to an embodiment of the present disclosure.

Referring to FIG. 11, based on the system requirement and amount of traffic to be scheduled, the BS (or gNB) decides how to allocate the available resources in an efficient and dynamic manner.

Figure 12:
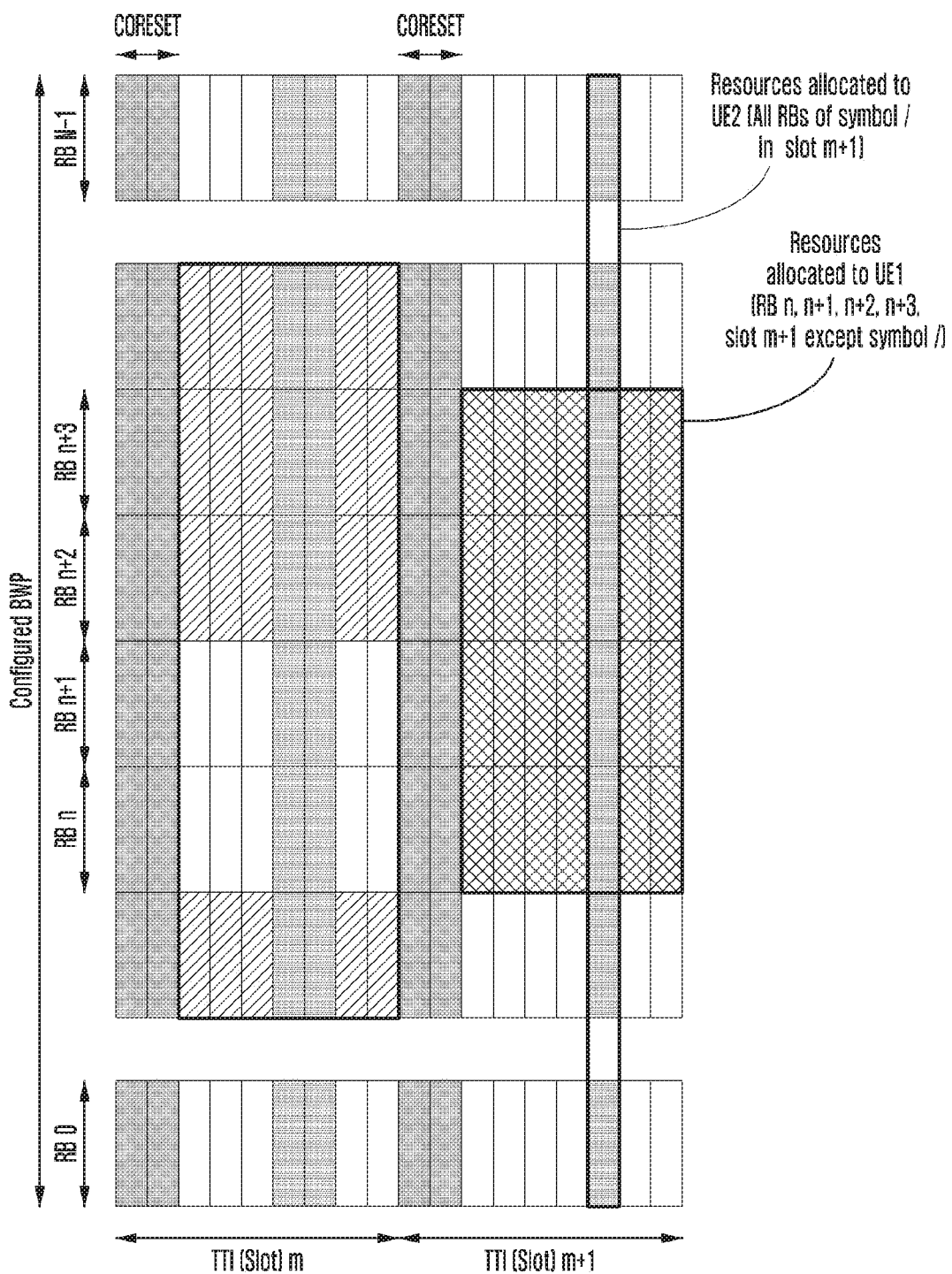
FIG. 12 illustrates an example of dynamic resource allocations according to an embodiment of the present disclosure.

FIG. 12 illustrates an example of dynamic resource allocations according to an embodiment of the present disclosure.

Referring to FIG. 12, multiple UEs can be multiplexed in a single TTI, and hence flexible resource allocation is required.

Time Domain Resource Configuration

In the system, the available resources during a time unit (e.g., a TTI) can be dynamically assigned to the UEs according to the scheduling requirement. It is possible that the resources can be assigned to the UEs in a TDM manner. The information on assigned symbols to the UE needs to be signaled, e.g., in DCI or a dedicated channel in a TTI. The indication can be valid to a certain UE, or a group of UEs based on a pre-defined rule, e.g., the UEs for a certain service. For example, certain signaled symbol assignment information can be commonly applied to the UEs for a specific service, and different symbol assignment information can be signaled to the UEs for another service.

Embodiment 1: Full Symbol Bitmap Indication

Figure 13:
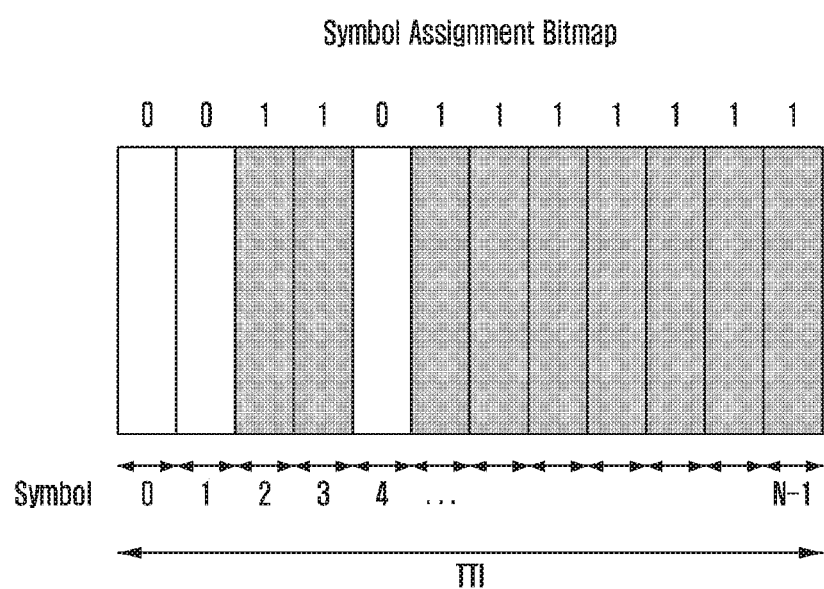
FIG. 13 illustrates an example of dynamic symbol bitmap indication according to an embodiment of the present disclosure.

FIG. 13 illustrates an example of dynamic symbol bitmap indication according to an embodiment of the present disclosure.

Referring to FIG. 13, if there are N symbols in the given TTI duration, a bitmap $\{b_0, b_1, \ldots, b_n, b_{n+1}, \ldots, b_{N-1}\}$ with length of N can be used to explicitly indicate if the n-th symbol is allocated or not, e.g., by setting $b_n=1$ or 0. The allocated symbols do not need to be continuous. This requires N bits for indication of each symbol, as shown in FIG. 13. For example, if N=14, an indication with 14 bits bitmap is required. If there are control symbols in the beginning of a TTI, the bitmap for these symbols can be included or precluded in the bitmap. The length of the signaled symbol bitmap can be pre-defined based on a certain rule, e.g., a fixed number of control symbols are not included in the symbol bitmap.

Embodiment 2: Indication of Start Symbol Index, End Symbol Index (or Number of Symbols)

Figure 14:
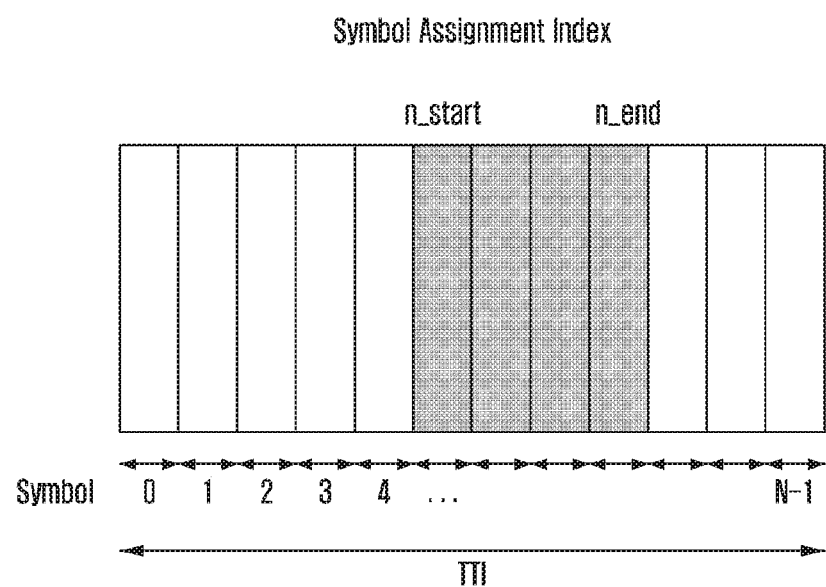
FIG. 14 illustrates an example of dynamic indication of start symbol and end symbol according to an embodiment of the present disclosure.

FIG. 14 illustrates an example of dynamic indication of start symbol and end symbol according to an embodiment of the present disclosure.

Referring to FIG. 14, if there are N symbols in the given TTI duration, an indication of ($n_{start}$, $n_{end}$) can be used to indicate that the symbols with index starting from $n_{start}$ to $n_{end}$ are allocated, as shown in FIG. 14. Alternatively, an indication of ($n_{start}$, $n_{symbol}$) can be used to indicate that $n_{symbol}$ continuous symbols starting from $n_{start}$ are allocated, i.e., till to the symbol with index ($n_{start}+n_{symbol}-1$). Or, an indication of ($n_{end}$, $n_{symbol}$) can be used to indicate that $n_{symbol}$ continuous symbols till $n_{end}$ are allocated, i.e., from the symbol with index ($n_{end}-n_{symbol}+1$) to the symbol with index $n_{end}$. This requires $2\lceil \log_2 N \rceil$ bits for indication. For example, if N=14, an indication with 8 bits is required.

Figure 15:
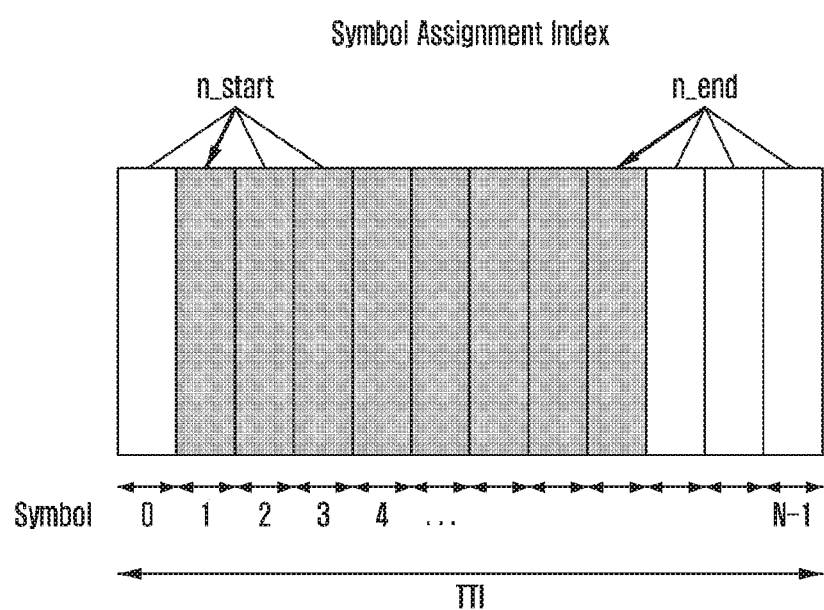
FIG. 15 illustrates an example of dynamic indication of start symbol and end symbol from symbol subset according to an embodiment of the present disclosure.

FIG. 15 illustrates an example of dynamic indication of start symbol and end symbol from symbol subset according to an embodiment of the present disclosure.

Referring to FIG. 15, to reduce the overhead, the indication of $n_{start}$ and $n_{end}$ can be applied to a limited number of symbols. For example, the $n_{start}$ only indicate one symbol among the first A symbols in the beginning of a TTI, the $n_{end}$ only indicate one symbol among the last B symbols in the end of a TTI, where A and B are pre-defined integer numbers. An example is shown in FIG. 15, where $n_{start}$ indicate one symbol among the first 4 symbols, and $n_{end}$ indicates one symbol among the last 4 symbols. In this way, it requires 2 bits for $n_{start}$ and 2 bits for $n_{end}$.

In some cases, it is possible that a certain parameter can be fixed or pre-configured. For example, the start symbol index $n_{start}$ can be in default configured to the $1^{st}$ symbol in the TTI or the $1^{st}$ symbol after the control symbol if present. The end symbol index $n_e$nd can be in default configured to the last symbol in the TTI. The number of symbols $n_{symbol}$ can fixed to a pre-defined number, e.g., 1 or 2. Based on the pre-configured parameters and dynamically signaled parameters, the UE can derive the assigned symbols.

In some cases, a set of starting symbols for data transmission can be configured, e.g., in the BWP configuration or CORESET configuration. If more than one value is configured, the exact starting symbol selected from the configured set is indicated in the DCI of a data transmission. Similarly, a set of possible ending symbols for data transmission or transmission duration can be configured. If more than one value is configured, the exact ending symbol or transmission duration selected from the configured set is indicated in the DCI of a data transmission. The size of the configured set of starting symbols and set of ending symbols (or transmission duration) determine the size of the related indication field in the DCI, e.g., time domain resource allocation field. If the size of the configured set of possible starting symbols is A, the indication filed in DCI may requires $\log_2 A$ bits. Similarly, if the size of the configured set of possible starting symbols is B, the indication filed in DCI may requires $\log_2 B$ bits. Two separate fields can be used to indicate the starting symbol and end symbol (or transmission duration), e.g., with $\log_2 A$ bits and $\log_2 B$ bits, respectively. Or, total $\log_2 AB$ bits can be used to jointly indicate the starting symbol and end symbol (or transmission duration). Or, 1 bit field in the DCI can be used to indicate the start symbol is the pre-defined one or the configured one in the control region configuration. Similarly, 1 bit field in the DCI can be used to indicate the end symbol is the pre-defined one or the configured one in the control region configuration. The configuration of the set of starting symbols and end symbols can be different for downlink and uplink data transmission. The configuration can be UE-specific. According to the pre-defined rule and the configuration, the UE decides the size of the corresponding time domain resource allocation field. The derived field length is assumed when UEs try to search a corresponding DCI.

Figure 16:
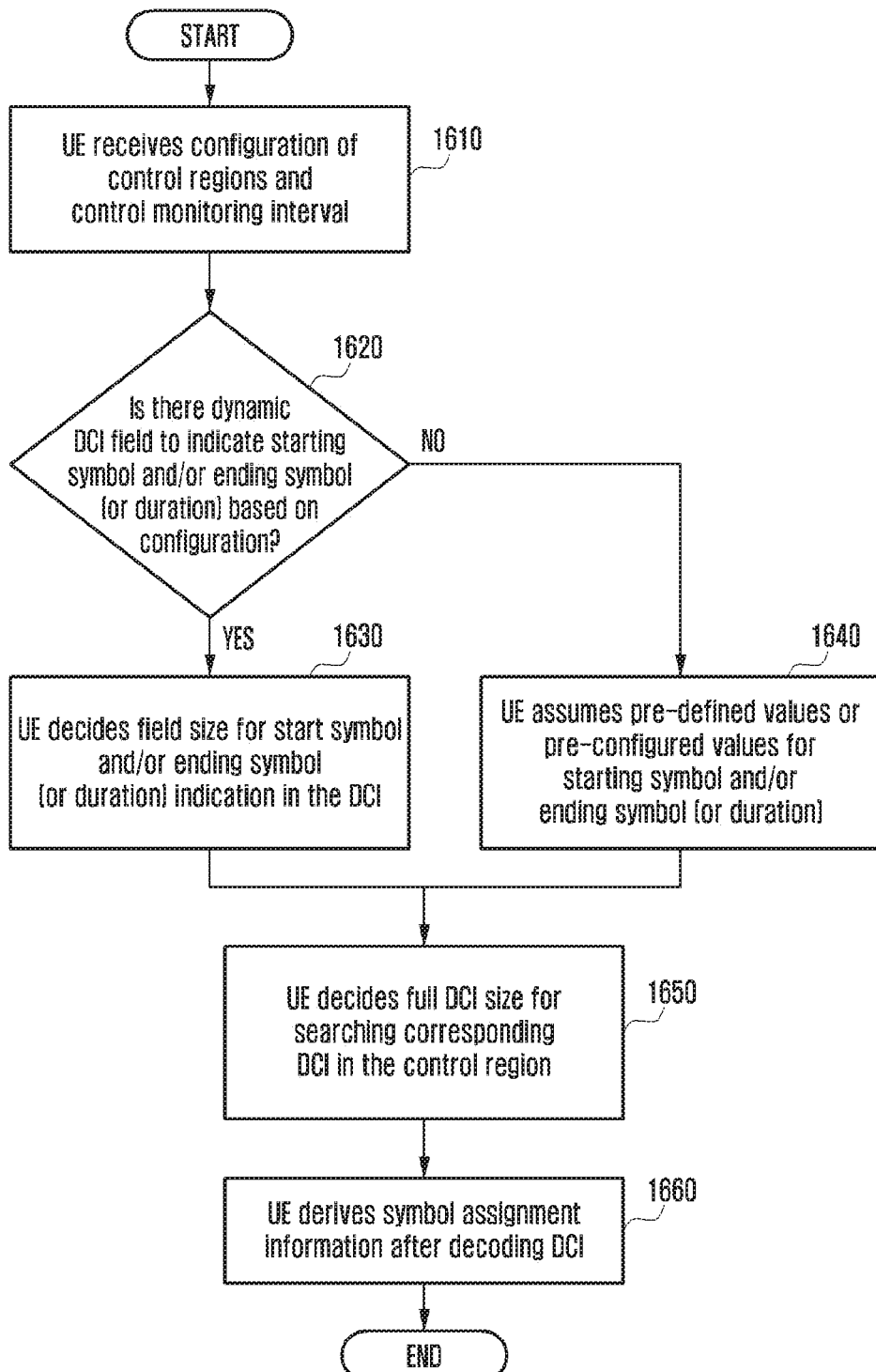
FIG. 16 illustrates a flow chart of UE procedure to derive symbol assignment procedure according to an embodiment of the present disclosure.

FIG. 16 illustrates a flow chart of UE procedure to derive symbol assignment procedure according to an embodiment of the present disclosure.

Referring to FIG. 16, UE receives a configuration of control regions and a control monitoring interval at operation 1610. UE identifies whether there is a dynamic DCI field to indicate a starting symbol and/or an ending symbol (or duration) based on the configuration at operation 1620. If the dynamic DCI field is configured, UE decide a field size for the start symbol and/or the ending symbol (or the duration) indication in the DCI at operation 1630. Otherwise, i.e., If no dynamic DCI field to indicate such information is configured, UE may assume pre-defined values or preconfigured values for the starting symbol and/or ending symbol (or duration) at operation 1640. UE decides a full DCI size for searching corresponding DCI in the control region at operation 1650. UE decodes the DCI to derive symbol assignment information at operation 1660.

In some cases, with separate configurations of a set of starting symbols and a set of ending symbols may not work well. For example, the network may only use some combinations of the starting symbols and ending symbols in the configuration. Some other combinations are not used. This results in wastage of the signaling bits, if to indicate all the combinations of the starting symbols and ending symbols in the configuration. For example, the network wants to multiplex the data transmission in a TDM manner in a slot, one candidate data transmission is from symbol 0 to symbol 6, and another candidate data transmission is from symbol 7 to 13. There are two candidates of starting symbol, e.g., 0 and 7, and two candidates of ending symbol, e.g., 6 and 13. However, gNB may not schedule a data transmission from 0 to 13 and from 7 to 6. With separate indication of starting symbols and ending symbols, 1 bit is needed to indicate the starting symbol and 1 bit is needed to indicate the ending symbol, which require total 2 bits. However, there are only two (2) interested scheduling cases from the network, which can be indicated by 1 bit.

Figure 17:
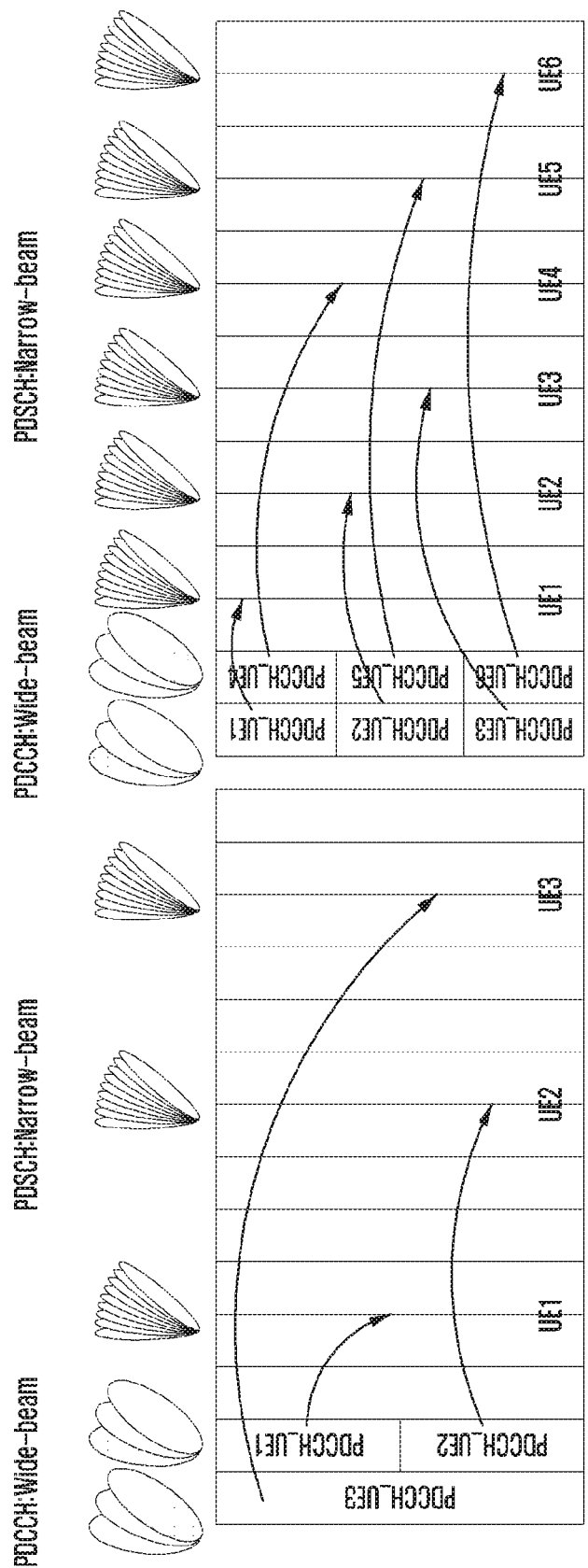
FIG. 17 illustrates an example of resource allocation with beamforming operation according to an embodiment of the present disclosure.

FIG. 17 illustrates an example of resource allocation with beamforming operation according to an embodiment of the present disclosure.

Referring to FIG. 17, as another example, when gNB transmits data via beamforming, gNB may schedule different symbol groups for different beams and multiplex beamformed data transmissions in a TDM manner within a slot, as shown in FIG. 17. Therefore, to support these resource allocation cases while reducing the signaling overhead and avoiding indication error case, another method is to directly configure the <starting symbol, ending symbol> to be used by the network. One or multiple sets of <starting symbol, transmission duration> (or equivalently <starting symbol, ending symbol>) for data transmission can be configured, e.g., in the control region configuration. If multiple sets are configured, the exact set selected from the configured set is indicated in the DCI of a data transmission. The number of the configured sets of <starting symbol, transmission duration> determines the size of the related indication field in the DCI, e.g., time domain resource allocation field. If the number of the configured sets is A, the indication filed in DCI may require $\lceil \log_2 A \rceil$ bits. The configuration of the set of <starting symbol, transmission duration> can be different for downlink and uplink data transmission. The configuration can be UE-specific, e.g., configured by RRC. Based on the configuration, the UE decides the size of the corresponding time domain resource allocation field in the DCI, and hence can determine the DCI size based on a pre-defined rule. The derived field length is assumed when UEs try to search a corresponding DCI.

Figure 18:
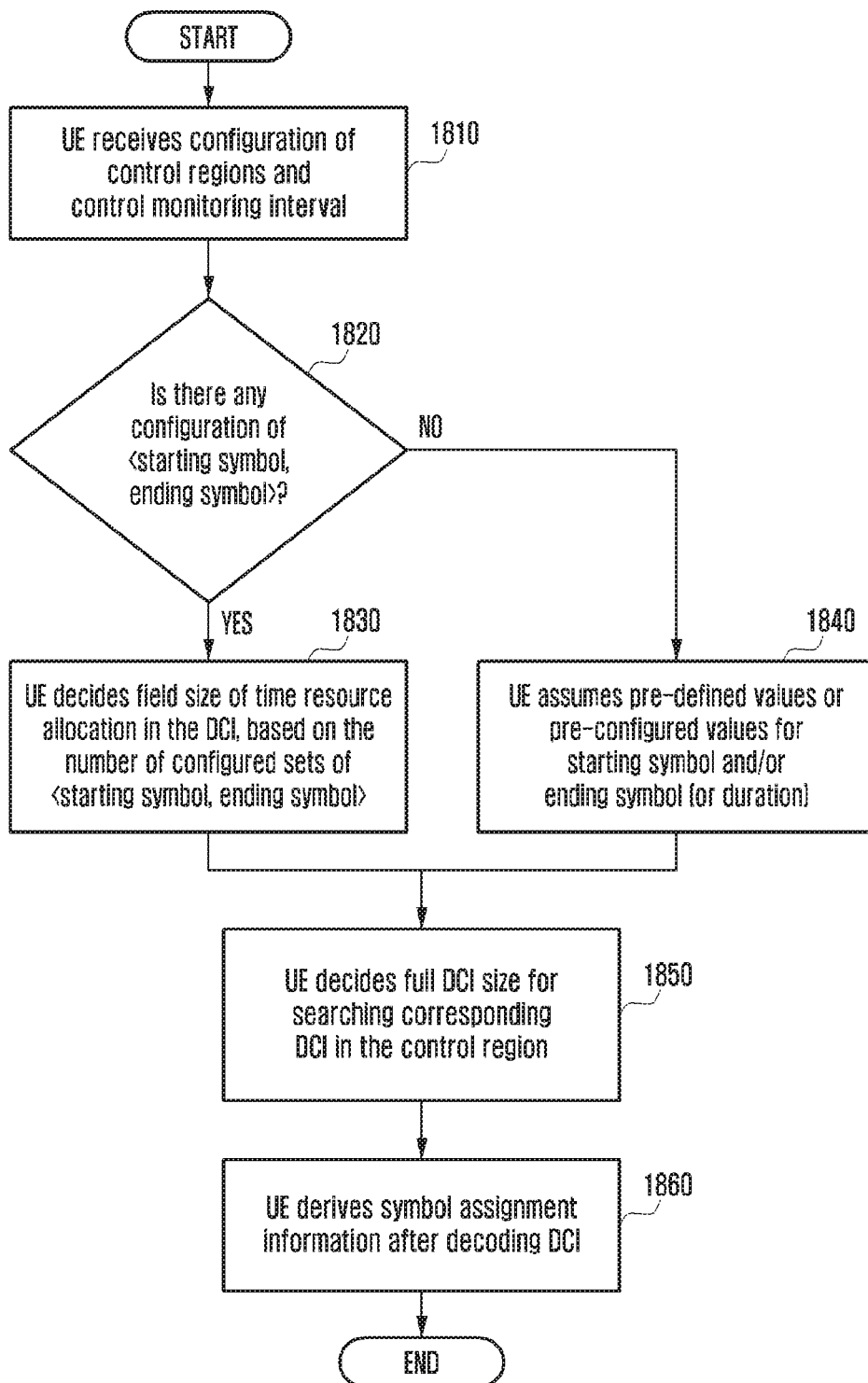
FIG. 18 illustrates a flowchart of UE procedure to derive symbol assignment information according to an embodiment of the present disclosure.

FIG. 18 illustrates a flow chart of UE procedure to derive symbol assignment procedure according to an embodiment of the present disclosure.

Referring to FIG. 18, UE receives a configuration of control regions and a control monitoring interval at operation 1810. UE identifies whether there is any configuration of <starting symbol, ending symbol> (or equivalently <starting symbol, transmission duration>) to indicate one or multiple sets of <starting symbol, ending symbol> at operation 1820. If the configuration to indicate one or multiple set of <starting symbol, ending symbol> exists, UE decide a field size of time resource allocation in the DCI, based on the number of configured sets of <starting symbol, ending symbol> at operation 1830. Otherwise, i.e., if such configuration does not exist, UE assumes predefined values or pre-configured values for starting symbol and/or ending symbol (or duration) at operation 1840. UE decides a full DCI size for searching corresponding DCI in the control region at operation 1850. UE derives symbol assignment information after decoding DCI at operation 1860.

Embodiment 3: Tree Based Indication of Continuously Allocated Symbols

Figure 19:
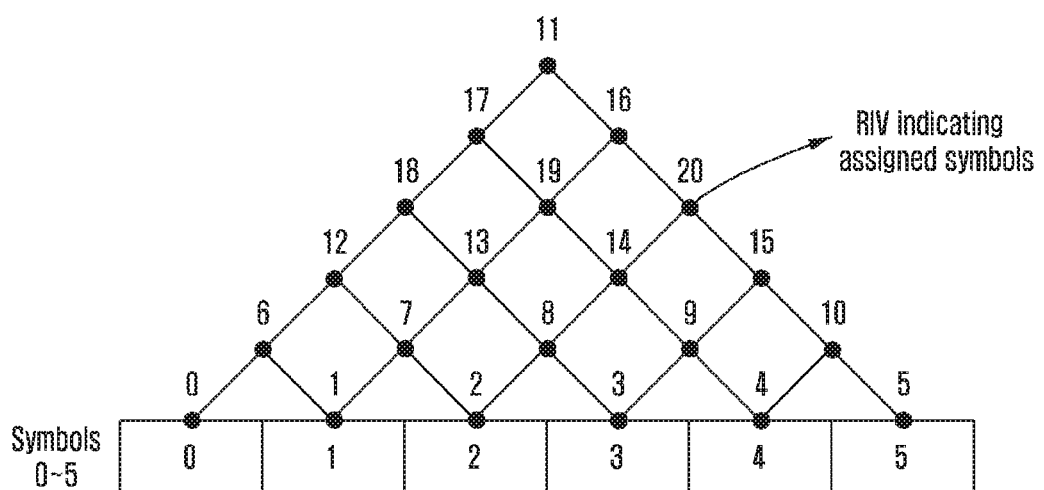
FIGS. 19 and 20 illustrate examples of continuous symbol assignment with tree based signaling method according to various embodiments of the present disclosure.
Figure 20:
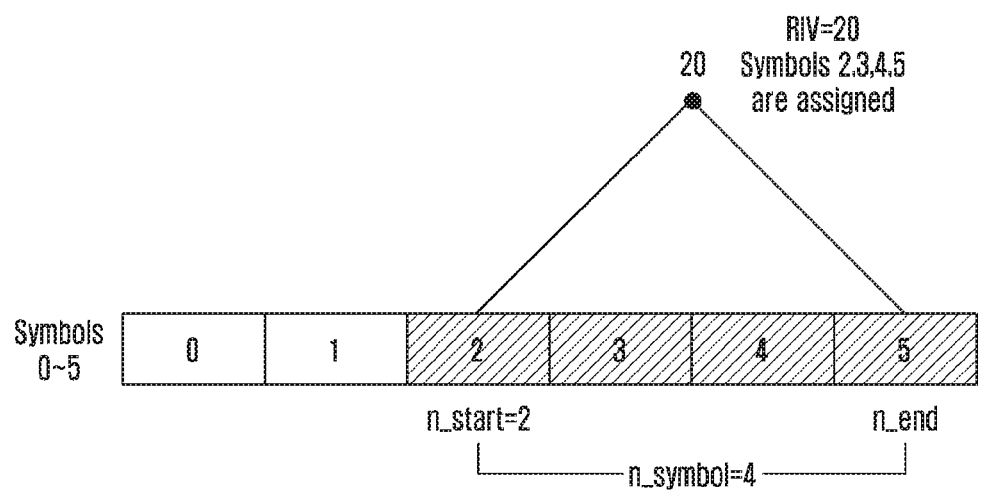

FIGS. 19 and 20 illustrate examples of continuous symbol assignment with tree based signaling method according to various embodiments of the present disclosure.

Referring to FIGS. 19 and 20, to further reduce the overhead, a tree based signaling method can be used for indication if continuous symbols are assigned. If there are N symbols in the given TTI duration, the possible cases of selecting a number of continuous symbols can be expressed by N, N−1, N−2, . . . , 1, respectively for selecting 1, 2, . . . , N continuous symbols. In total, there are total $$\frac{N(N+1)}{2}$$

combinations of continuous symbol assignment. A resource indication value (RIV) can be signaled, to derive the index of starting symbol $n_{start}$ and the number of assigned continuous symbols $n_{symbol}$. The relationship between RIV and $n_{start}/n_{symbol}$ can be expressed as follows:

$$\text{If } n_{symbol} - 1 \leq \left\lfloor \frac{N}{2} \right\rfloor, RIV = N(n_{symbol} - 1) + n_{start}$$

$$\text{Else } \left(i.e., n_{symbol} - 1 > \left\lfloor \frac{N}{2} \right\rfloor\right), RIV = N(N - n_{symbol} + 1) + (N - 1 - n_{start})$$

This requires $$\left\lceil \log_2 \frac{N(N+1)}{2} \right\rceil$$

bits for indication. For example, if N=14, an indication with 7 bits is required. In FIG. 19, an example of N=6 is shown.

Based on the indicated RIV, the UE can derive the values of $n_{start}$ and $n_{symbol}$ as follows:

$$\left\lfloor \frac{RIV}{N} \right\rfloor + 1, b = RIV \bmod N$$

$$\text{If } a + b > N, n_{symbol} = N + 2 - a, n_{start} = N - 1 - b;$$

$$\text{Else } (i.e., a + b \leq N), n_{symbol} = a, n_{start} = b.$$

This scheme does not require a lookup table, and the UE can simply derive the values of $n_{start}$ and $n_{symbol}$ and obtain the information of assigned symbols. FIG. 20 illustrates how to derive the assigned symbols based on the signaled RIV.

Figure 21:
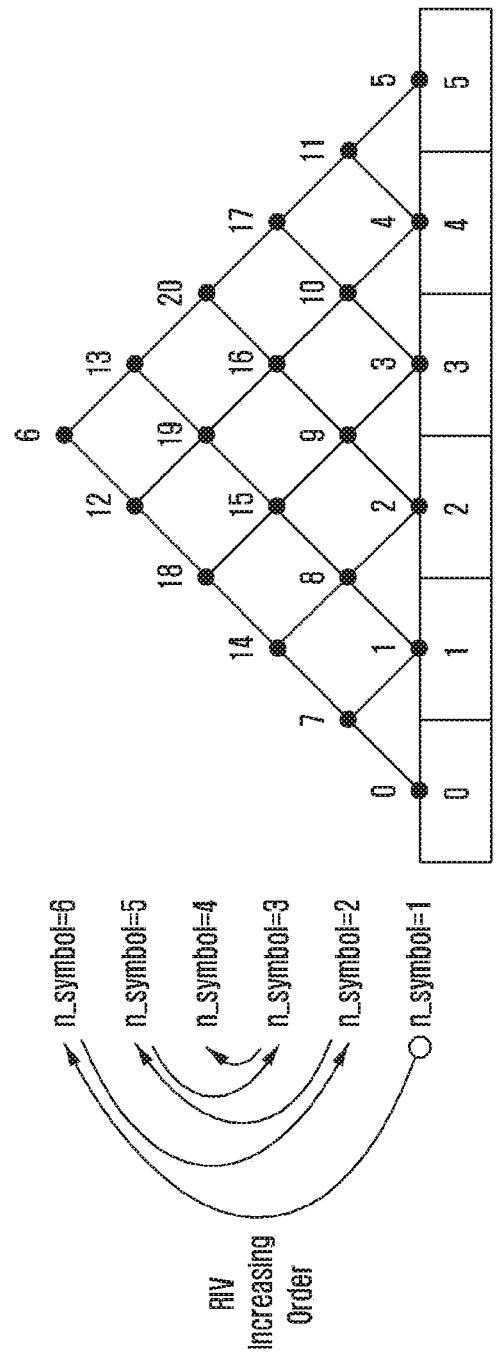
FIG. 21 illustrates another example of continuous symbol assignment with tree based signaling method according to an embodiment of the present disclosure.

FIG. 21 illustrates another example of continuous symbol assignment with tree based signaling method according to an embodiment of the present disclosure.

Referring to FIG. 21, alternative tree based signaling method can be used for indication if continuous symbols are assigned. There are total $$\frac{N(N+1)}{2}$$

combinations of continuous symbol assignment. A resource indication value (RIV) can be arranged in different order based on a pre-defined rule. For example, the RIV is arranged in an increasing order for the number of assigned symbols are 1, N, 2, N−1, 3, N−2, and so on. The number of combination for the number of assigned symbols with n and N+1-n is always N+1. The RIV values can be determined accordingly. The other arrangement options are also possible if the rule is clearly defined. Based on the signaled RIV, the index of starting symbol $n_{start}$ and the number of assigned continuous symbols $n_{symbol}$ can be derived. The relationship between RIV and $n_{start}/n_{symbol}$ can be expressed as follows:

$$\text{If } n_{symbol} - 1 \leq \left\lfloor \frac{N}{2} \right\rfloor, RIV = (N+1)(n_{symbol} - 1) + n_{start}$$

$$\text{Else } \left(\text{i.e., } n_{symbol} - 1 > \left\lfloor \frac{N}{2} \right\rfloor\right),$$

$$RIV = (N+1)(N - n_{symbol}) + (n_{start} + n_{symbol})$$

Based on the indicated RIV, the UE can derive the values of $n_{start}$ and $n_{symbol}$ as follows:

$$a = \left\lfloor \frac{RIV}{N+1} \right\rfloor + 1, b = RIV \bmod (N+1)$$

$$\text{If } a + b > N, n_{symbol} = N - a + 1, n_{start} = a + b - N - 1;$$

$$\text{Else (i.e., } a + b \leq N), n_{symbol} = a, n_{start} = b.$$

Similarly, this scheme does not require a lookup table, and the UE can simply derive the values of $n_{start}$ and $n_{symbol}$ and obtain the information of assigned symbols. In FIG. 21, an example of N=6 is shown, with the RIV arranged in an increasing order for the number of assigned symbols are 1, 6, 2, 5, 3, 4.

Embodiment 4: Indication of Non-Allocated Symbols

Figure 22:
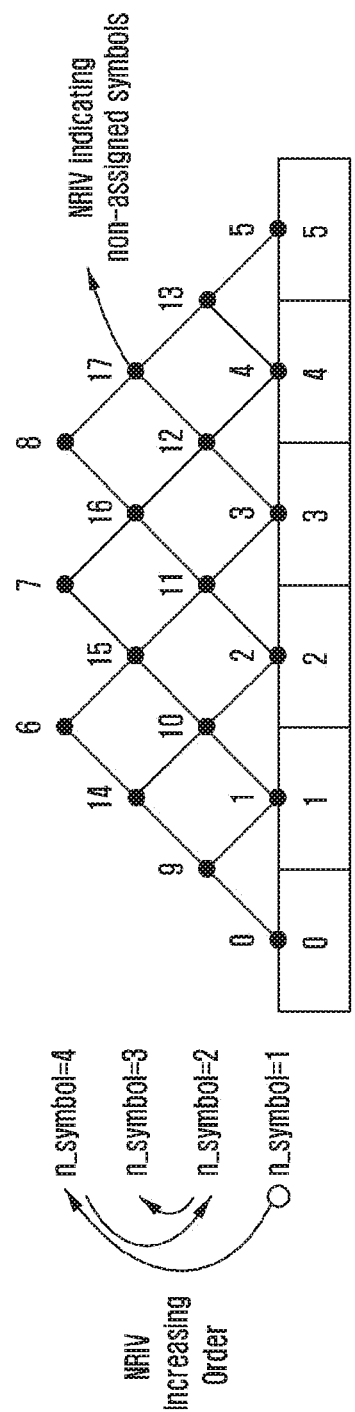
FIGS. 22 and 23 illustrate examples of indicating non-assigned symbol with tree based signaling method according to various embodiments of the present disclosure.
Figure 23:
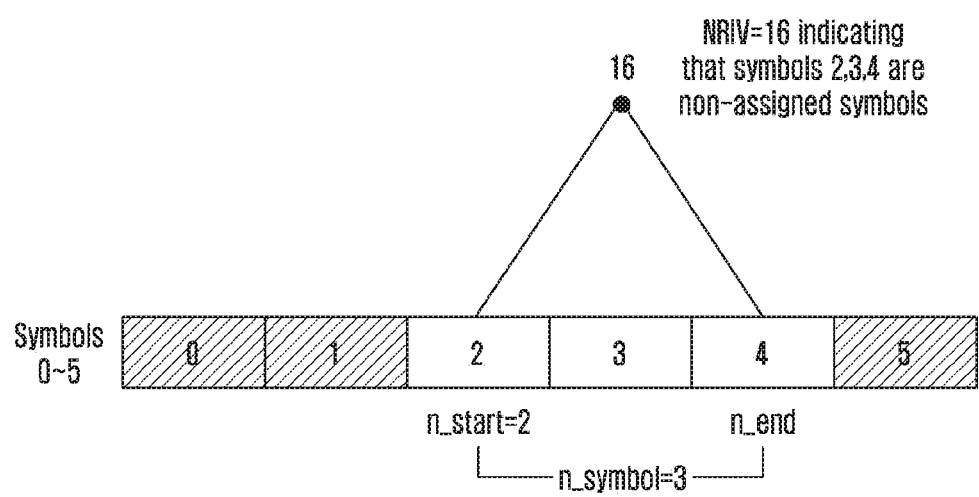

FIGS. 22 and 23 illustrate examples of indicating non-assigned symbol with tree based signaling method according to various embodiments of the present disclosure.

Referring to FIGS. 22 and 23, it is also possible to indicate the information of non-assigned symbols in the TTI to the UEs, e.g., if a small number of symbols may be used for other services. Excluding the non-assigned symbols, the remaining symbols in the TTI are considered as the assigned symbols to the UE.

Assume that non-assigned symbols are continuously located; a tree based signaling method can be used to indicate the continuously non-assigned symbols. Assume that the maximum number of non-assigned symbols is $N_1$, the total number of possible combinations is $N+(N-1)+(N-2)+ \ldots +(N-N_1+1)$. A non-assigned resource indication value (NRIV) can be arranged in different order based on a pre-defined rule. For example, the NRIV is arranged in an increasing order for the number of non-assigned symbols are 1, $N_1$, 2, $N_1-1$, 3, $N_1-2$, and so on. The other arrangement options are also possible if the rule is clearly defined. Based on the signaled NRIV, the index of non-assigned first symbol $\tilde{n}_{start}$ and number of non-assigned symbols $\tilde{n}_{symbol}$ can be derived. An example of the relationship between NRIV and $\tilde{n}_{start}/\tilde{n}_{symbol}$ can be expressed as follows:

$$\text{If } \tilde{n}_{symbol} - 1 \leq \left\lfloor \frac{N_1}{2} \right\rfloor, NRIV = (2N - N_1 + 1)(\tilde{n}_{symbol} - 1) + \tilde{n}_{start}$$

$$\text{Else } \left(\text{i.e., } \tilde{n}_{symbol} - 1 > \left\lfloor \frac{N}{2} \right\rfloor\right),$$

$$NRIV = (2N - N_1 + 1)(N_1 - \tilde{n}_{symbol}) + (\tilde{n}_{start} + \tilde{n}_{symbol})$$

Based on the indicated RIV, the UE can derive the values of $\tilde{n}_{start}$ and $\tilde{n}_{symbol}$ as follows:

$$a = \left\lfloor \frac{RIV}{2N - N_1 + 1} \right\rfloor + 1, b = NRIV \bmod (2N - N_1 + 1)$$

$$\text{If } a + b > N, \tilde{n}_{symbol} = N_1 - a + 1, \tilde{n}_{start} = a + b - N - 1;$$

$$\text{Else (i.e., } a + b \leq N), \tilde{n}_{symbol} = a, \tilde{n}_{start} = b.$$

In FIG. 22, an example of N=6, $N_1$=3 is shown, with the NRIV arranged in an increasing order for the number of assigned symbols are 1, 4, 2, 3. FIG. 23 illustrates how to derive the assigned symbols based on the signaled NRIV.

Embodiment 5: Combined Indication of Allocated and Non-Allocated Symbols

Figure 24:
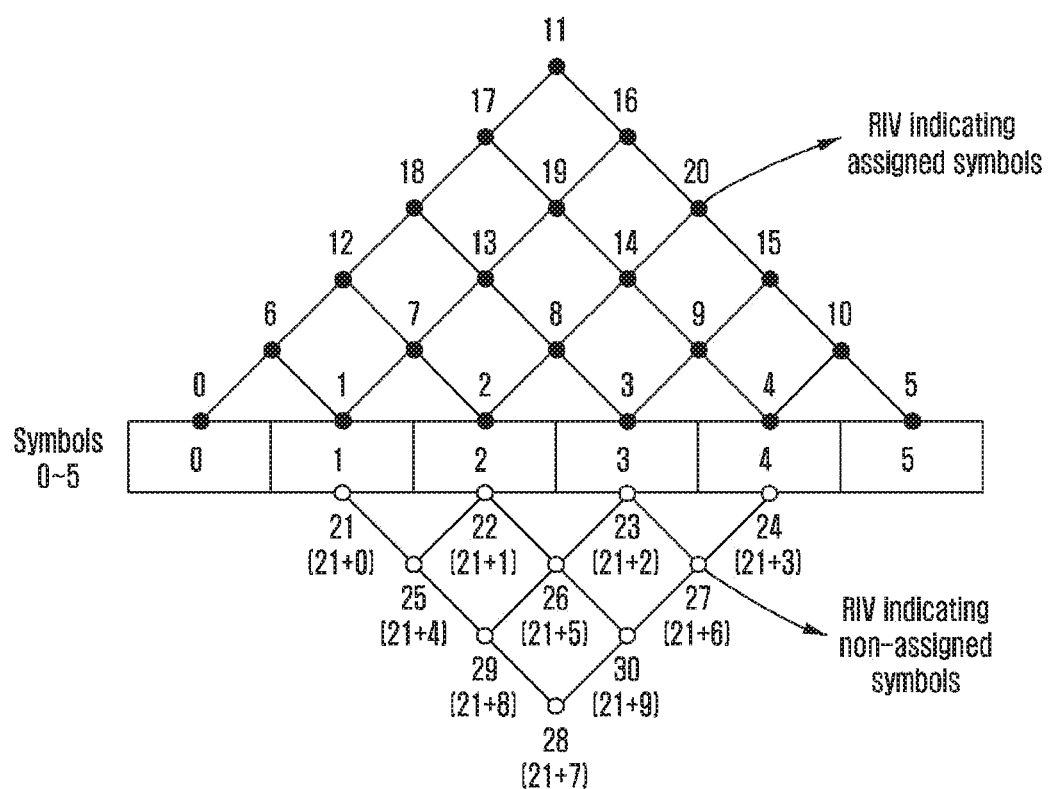
FIGS. 24 and 25 illustrate examples of indicating assigned or non-assigned symbol with tree based signaling method according to various embodiments of the present disclosure.
Figure 25:
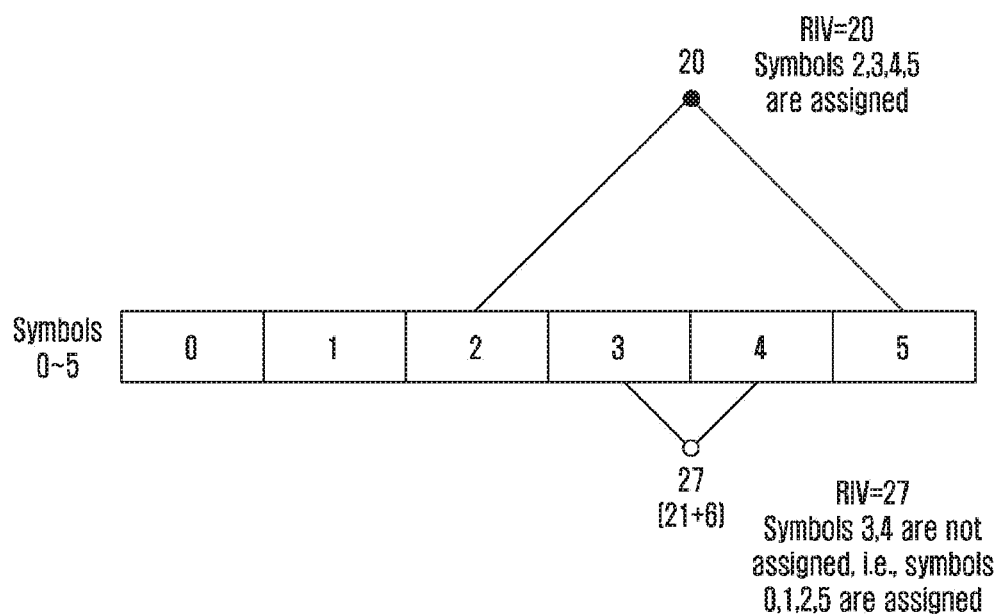

FIGS. 24 and 25 illustrate examples of indicating assigned or non-assigned symbol with tree based signaling method according to various embodiments of the present disclosure.

Referring to FIGS. 24 and 25, it is also possible to combine the tree based signaling method for indication of continuously assigned symbols and non-assigned symbols can be used for indication. The RIV is composed of two subsets, where the $1^{st}$ subset is for indication of continuously assigned symbols (assuming that the assigned symbols are continuous), and the $2^{nd}$ subset is for indication of discontinuously assigned symbols (assuming that the non-assigned symbols are continuous).

$1^{st}$ RIV subset: The RIV in the $1^{st}$ subset is used to indicate continuously assigned symbols. Similar as the RIV in Embodiment 3, $$\frac{N(N+1)}{2}$$

values $$\left(\text{e.g., from 0 to } \frac{N(N+1)}{2} - 1\right)$$

can be used to indicate the continuously assigned symbols to derive the index of first assigned symbol $n_{start}$ and number of assigned symbols $n_{symbol}$. The relationship between RIV and $n_{start}/n_{symbol}$ can be expressed as follows:

$$\text{If } n_{symbol} - 1 \leq \left\lfloor \frac{N}{2} \right\rfloor, RIV = (N+1)(n_{symbol} - 1) + n_{start}$$

$$\text{Else } \left(\text{i.e., } n_{symbol} - 1 > \left\lfloor \frac{N}{2} \right\rfloor\right),$$

$$RIV = (N+1)(N - n_{symbol}) + (n_{start} + n_{symbol})$$

$2^{nd}$ RIV subset: The RIV in the $2^{nd}$ subset is used to indicate the discontinuously assigned symbols. Assume that non-assigned symbols are continuously located and not in the side of a TTI, a tree based signaling method can be used to indicate the continuously non-assigned symbols, e.g., among N-2 symbols, where the first and last symbols are not counted. Thus, $$\frac{(N-2)(N-1)}{2}$$

values $$\left(\text{e.g., from } \frac{N(N+1)}{2} \text{ to } \frac{N(N+1)}{2} + \frac{(N-2)(N-1)}{2}\right)$$

can be used to indicate these additional combinations, to derive the index of non-assigned first symbol ñ$_{start}$ and number of non-assigned symbols ñ$_{symbol}$, as shown in FIG. 24. After deriving the non-assigned symbols, the assigned symbols can be accordingly obtained.

This requires $$\left\lceil \log_2\left(\frac{N(N+1)}{2} + \frac{(N-2)(N-1)}{2}\right)\right\rceil = \lceil\log_2(N^2 - N + 1)\rceil$$

bits for indication. For example, if N=14, an indication with 8 bits is required. The example with N=6 is shown in FIG. 25.

Figure 26:
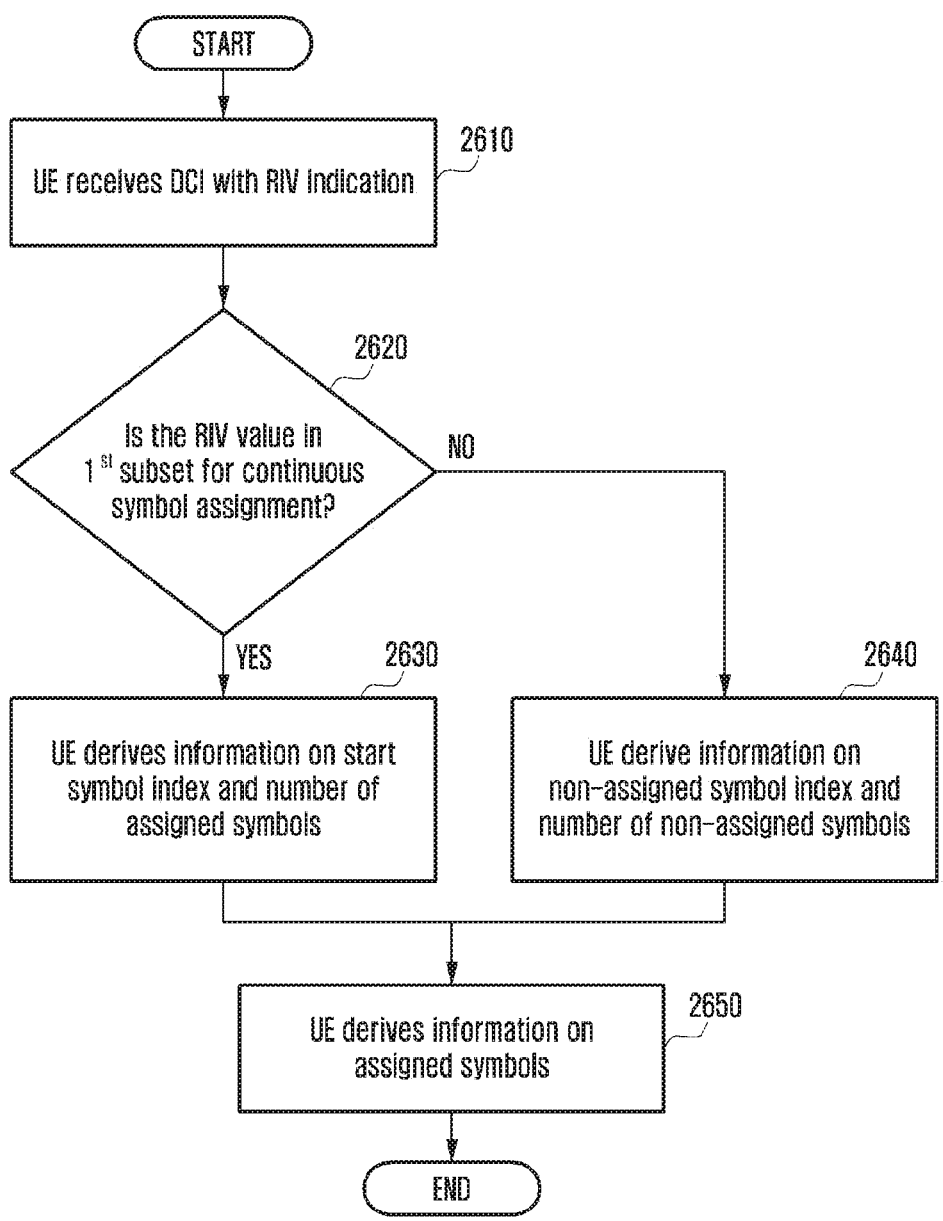
FIG. 26 illustrates a flowchart of UE procedure to determine assigned or non-assigned symbols with tree based signaling method according to an embodiment of the present disclosure.

FIG. 26 illustrates a flowchart of UE procedure to determine assigned or non-assigned symbols with tree based signaling method according to an embodiment of the present disclosure.

Referring to FIG. 26, UE receives a DCI with a RIV indication at operation 2610. UE determines whether the RIV value is in 1$^{st}$ subset for continuous symbol assignment or in 2$^{nd}$ subset for discontinuous symbol assignment at operation 2620. If the RIV value is in 1$^{st}$ subset for continuous symbol assignment, UE derives information on a start symbol index and the number of continuously assigned symbols at operation 2630. Otherwise, i.e., if the RIV value is in 2$^{nd}$ subset for discontinuously assigned symbol, UE derives information on non-assigned symbol index and the number of non-assigned symbols at operation 2640. UE derives information on the assigned symbols at operation 2650.

A flag can be used to indicate the signaled symbols are assigned symbols or non-assigned symbols, e.g., 1 bit indication. The symbol indication can be interpreted depending on the flag, i.e., assigned symbols or non-assigned symbols.

Embodiment 6: Symbol Group Indication

If there are N symbols in the given TTI duration, there can be $N_G = \lceil N/N_1 \rceil$ symbol groups by combining $N_1$ symbols in a group based on a pre-defined rule. The resource indication can be based on the symbol groups, i.e., the symbols of the indicated symbol groups are assigned.

Embodiment 6.1: Symbol Group Bitmap

If there are $N_G$ symbol groups in the given TTI duration, a bitmap $\{b_0, b_1, \ldots, b_n, b_{n+1}, \ldots, b_{N_G-1}\}$ with length of $N_G$ can be used to explicitly indicate if the n-th symbol group is allocated or not, e.g., by setting $b_n=1$ or 0. This requires $N_G$ bits for indication of each symbol.

Embodiment 6.2: Start Symbol Group Index, End Symbol Group Index (or Number of Symbol Groups)

If there are $N_G$ symbol groups in the given TTI duration, an indication of ($n_{start}$, $n_{end}$) can be used to indicate that the symbol groups with index starting from $n_{start}$ to $n_{end}$ are allocated. Alternatively, an indication of ($n_{start}$, $n_{group}$) can be used to indicate that $n_{group}$ continuous symbol groups starting from $n_{start}$ are allocated, i.e., till to the symbol group with index ($n_{start}+n_{group}-1$). This requires $2\lceil \log_2 N_G\rceil$ bits for indication.

Embodiment 6.3: Allocated Symbol Groups

For another example, a tree based signaling method can be used for indication if continuous symbol groups are assigned. A resource indication value (RIV) can be signaled, to derive the index of starting symbol $n_{start}$ and the number of assigned continuous symbol groups $n_{group}$. The relationship between RIV and $n_{start}/n_{group}$ can be expressed as follows:

$$\text{If } n_{group} - 1 \leq \left\lfloor\frac{N_G}{2}\right\rfloor, RIV = N_G(n_{group} - 1) + n_{start}$$

$$\text{Else }\left(\text{i.e., } n_{group} - 1 > \left\lfloor\frac{N_G}{2}\right\rfloor\right),$$

$$RIV = N_G(N_G - n_{group} + 1) + (N_G - 1 - n_{start})$$

This requires $$\left\lceil \log_2 \frac{N_G(N_G + 1)}{2}\right\rceil$$

bits for indication.

The above symbol assignment in a slot can be used together with slot assignment in the resource allocation. For example, it is possible that more than one slot can be allocated for data transmission, which can be indicated by a separate field. In that case, the symbol assignment can be applied to all the allocated slots.

Frequency Domain Resource Allocation

The number of RBs in a cell may depend on the system bandwidth and numerologies. The UE may assume that the frequency domain resource allocation is based on the system bandwidth. If a frequency subband or a bandwidth part (BWP) is configured to a UE for data transmission or reception, the UE assumes that the frequency domain resource allocation is based on the configured BWP. Given the configured numerology, the UE can derive the RB size and number of total RBs in the system bandwidth or configured BWP. The RB indices scheduled for a UE can be signaled in the following ways.

Embodiment 1: RB Indication

Embodiment 1.1: RB Bitmap

This option uses a bitmap to indicate which RBs are allocated to a UE. The allocated RBs do not need to be contiguous. For example, a value of 1 indicates that the RB is allocated to the UE. If the number of total RBs is $N_{RB}$, this requires a bitmap of length $N_{RB}$.

Embodiment 1.2: RB Index and Number of RBs

This option indicates a start RB index and number of RBs allocated to a UE. The allocated RBs are contiguous. If the number of total RBs is $N_{RB}$, this requires an indication of a start RB index with $\log_2 N_{RB}$ bits, and the number of RBs with $\log_2 N_{RB}$, with total $2 \log_2 N_{RB}$ bits.

Embodiment 1.3: RIV Indication

The tree based signaling method can be used to indicate a set of contiguous RBs allocated to a UE. This is similar as the downlink resource allocation type 2 and uplink resource allocation type 0 in LTE. If the number of total RBs is $N_{RB}$, the RIV corresponds to a starting RB with index $RB_{start}=0, 1, 2, \ldots, N_{RB}-1$ and a length in terms of allocated RBs with $L_{RB}=1, 2, \ldots, N_{RB}$. The relationship between RIV and $RB_{start}$ and $L_{RB}$ can be expressed as follows:

$$\text{If } L_{RB} - 1 \leq \left\lfloor \frac{N_{RB}}{2} \right\rfloor, RIV = N_{RB}(L_{RB} - 1) + RB_{start}$$

$$\text{Else } \left(\text{i.e., } L_{RB} - 1 > \left\lfloor \frac{N_{RB}}{2} \right\rfloor \right),$$

$$RIV = N_{RB}(N_{RB} - L_{RB} + 1) + (N_{RB} - 1 - RB_{start})$$

where $L_{RB} \geq 1$ and shall not exceed $N_{RB}-RB_{start}$. This requires $$\left\lceil \log_2 \frac{N_{RB}(N_{RB}+1)}{2} \right\rceil$$

bits for indication, which can be used in the frequency RB assignment field in the DCI. There could be many cases of the signaling bit length depending on the system/BWP parameters, which makes the DCI size variable. To reduce the cases of signaling bit length and hence somewhat limit the cases of DCI sizes; some possible bit lengths of frequency RB assignment field can be pre-defined. If there are multiple pre-defined candidates of bit length for the frequency RB assignment field in the DCI, e.g., $\{L_0, L_1, L_2, \ldots\}$, the minimum value $L_n$ which is larger than or equal to $$\left\lceil \log_2 \frac{N_{RB}(N_{RB}+1)}{2} \right\rceil$$

can be used as the bit length of the frequency RB assignment field. All the $L_n$ bits can be directly used provide a RIV and indicate the allocated RBs. Or, among the $L_n$ bits, the $$\left\lceil \log_2 \frac{N_{RB}(N_{RB}+1)}{2} \right\rceil$$

can be used to indicate the RB allocations, and the remaining $$L_n - \left\lceil \log_2 \frac{N_{RB}(N_{RB}+1)}{2} \right\rceil$$

bits can be used as padding bits.

Figure 27:
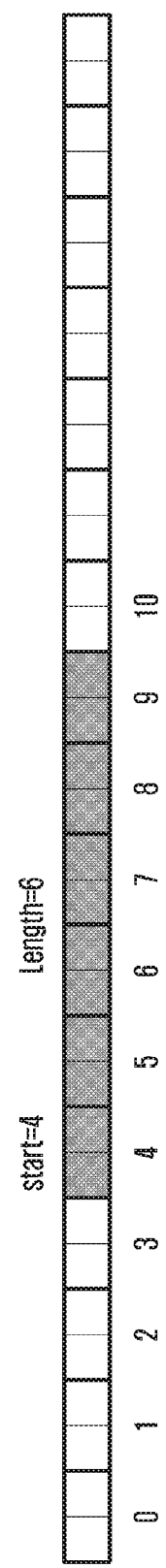
FIG. 27 illustrates an example of continuous RB allocations with indication granularity of 2 RBs according to an embodiment of the present disclosure.

FIG. 27 illustrates an example of continuous RB allocations with indication granularity of 2 RBs to an embodiment of the present disclosure.

Referring to FIG. 27, to further reduce the overhead, the indication granularity or increment step can be more than one RB, e.g., $N_{RB}^{step}$ RBs, RIV corresponds to a starting RB with index $$RB_{start} = 0, N_{RB}^{step}, 2N_{RB}^{step}, \ldots, \left(\left\lfloor \frac{N_{RB}}{N_{RB}^{step}} \right\rfloor - 1\right)N_{RB}^{step}$$

and a length in terms of allocated RBs with $$L_{RB} = N_{RB}^{step}, 2N_{RB}^{step}, \ldots, \left\lfloor \frac{N_{RB}}{N_{RB}^{step}} \right\rfloor N_{RB}^{step}.$$

The relationship between RIV and $RB_{start}$ and $L_{RB}$ can be expressed as follows:

$$\text{If } L'_{RB} - 1 \leq \left\lfloor \frac{N'_{RB}}{2} \right\rfloor, RIV = N'_{RB}(L'_{RB} - 1) + RB'_{start}$$

$$\text{Else } \left(\text{i.e., } L'_{RB} - 1 > \left\lfloor \frac{N'_{RB}}{2} \right\rfloor, \right),$$

$$RIV = N'_{RB}(N'_{RB} - L'_{RB} + 1) + (N'_{RB} - 1 - RB'_{start})$$

where $L'_{RB}=L_{RB}/N_{RB}^{step}$, $RB'_{start}=RB_{start}/N_{RB}^{step}$, $N'_{RB}/N_{RB}^{step}$, and $L'_{RB} \geq 1$ and shall not exceed $N'_{RB}-RB'_{start}$. This requires $$\left\lceil \log_2 \frac{N'_{RB}(N'_{RB}+1)}{2} \right\rceil$$

bits for indication. An example of indication granularity of 2 RBs ($N_{RB}^{step}=2$) is shown in FIG. 27. The candidate indication granularity can be 2, 4, 8, 16, 32, etc.

This compact resource allocation can be used for scheduling of system information, paging messages and random access response or data transmission requires reduced signaling overhead. The size of the indication granularity $N_{RB}^{step}$ can be fixed or predefined based on a function of the number of RBs in the system bandwidth or the configured bandwidth part.

There can be multiple sets of indication granularities, for different TTI cases, or for different PDCCH monitoring intervals configured by the system. For example, one set can be for the TTI case with 14 symbols, another set for the TTI case with 7 symbols, and one or multiple sets for the TTI case with less than 7 symbols. A reference set can be used to derive the other sets, e.g., by scaling the indication granularity size. For example, the set of indication granularity size for TTI with 14 symbols can be the reference set, as denoted by Set 0 in the Table 1. The Set 1 is the set of indication granularity size for TTI with 7 symbols. The indication granularity size with the same number of RBs can be simply derived by scaling the number, e.g., Y0=2*X0, where the scalar 2=14/Num_symbol_TTI is from the difference of number of symbols in the time domain. In this way, the indication granularity can have similar amount of REs in different TTI cases. Or, a set of pre-defined scaling factors can be used, e.g., 2 times for TTI with 7 symbols, 4 times for TTI with 2 symbols, 8 times for TTI with 1 symbol.

TABLE 1

Set of indication granularity size for compact DCI format in different cases

| # of RBs | Indication granularity size (Set 0) | Indication granularity size (Set 1) | Indication granularity size (Set 2) |
|---|---|---|---|
| <=N0 | X0 | Y0 | Z0 |
| N0 + 1 ~ N1 | X1 | Y1 | Z1 |
| N1 + 1 ~ N2 | X2 | Y2 | Z2 |
| N2 + 1 ~ N3 | X3 | Y3 | Z3 |
| ... | ... | ... | ... |

Given a pre-defined reference set of indication granularity, the scaling factor for calculate the indication granularity $N_{RB}^{step}$ can be configured for a certain control region, or for certain search space. The indication granularity is calculated by scaling the reference indication granularity in the corresponding RB size by the configured scalar value. Or, the size of indication granularity $N_{RB}^{step}$ can be explicitly configured for a CORESET, or for certain search space, or for the corresponding DCI format with RIV based resource allocation type. A size of indication granularity $N_{RB}^{step}$ can be configured to a UE as a UE-specific configuration. Based on the indication granularity $N_{RB}^{step}$ which is derived based on a pre-defined rule or configured, as well as the BW for resource allocation, the length of signaling bits corresponding to frequency domain resource allocation can be derived, e.g., $$\left\lceil \log_2 \frac{N'_{RB}(N'_{RB}+1)}{2} \right\rceil$$

where $N'_{RB} = \lceil N_{RB}/N_{RB}^{step} \rceil$. Similarly, if there are multiple pre-defined candidates of bit length for the frequency RB assignment field in the DCI, e.g., $\{L_0, L_1, L_2, \ldots\}$, the minimum value $L_n$ which is larger than or equal to $$\left\lceil \log_2 \frac{N'_{RB}(N'_{RB}+1)}{2} \right\rceil$$

can be used as the bit length of the frequency RB assignment field. The derived length of signaling bits is assumed when UEs try to search a corresponding DCI.

Alternatively, if there are multiple pre-defined candidates of bit length for frequency RB assignment field, e.g., $\{L_0, L_1, L_2, \ldots\}$, the bitmap size can be explicitly configured for a BWP, or for a CORESET, or for certain search space, or for the corresponding DCI format with RIV based resource allocation type. Assume that there are $N_{RB}$ RBs in the configured BWP, and a frequency RB assignment field bit length $L_n$ is configured, the minimum candidate indication granularity $N_{RB}^{step}$ (e.g., among pre-defined values 2, 4, 8, 16, 32, etc.) which satisfying $$\left\lceil \log_2 \frac{N'_{RB}(N'_{RB}+1)}{2} \right\rceil \leq L_n, N'_{RB} = \lceil N_{RB}/N_{RB}^{step} \rceil$$

is used as the indication granularity. So among the signaling bit length with configured size $L_n$, the actually required bit length is $$\left\lceil \log_2 \frac{N'_{RB}(N'_{RB}+1)}{2} \right\rceil.$$

All the $L_n$ bits can be directly used provide a RIV and indicate the allocated RBs. Or, among the $L_n$ bits, the $$\left\lceil \log_2 \frac{N'_{RB}(N'_{RB}+1)}{2} \right\rceil$$

can be used to indicate the RB allocations, and the remaining $$L_n - \left\lceil \log_2 \frac{N'_{RB}(N'_{RB}+1)}{2} \right\rceil$$

bits can be used as padding bits.

Embodiment 2: RB Group Indication

A RB Group (RBG) can be defined which consists of a number of RBs. The number of RBs within a RBG can be fixed or predefined based on a function of the system bandwidth. If the gNB configured a bandwidth part for resource allocation inside, the RBG size can be a function of the configured bandwidth part. Given the number of available RBs, the system bandwidth or a configured bandwidth part includes a number of compete RBG, and a partial RBG can be included if the total number of RBs is not a multiple of RBG size. The indicated RBG index can be associated with the physical RB index based on a pre-define rule. For example, if there are K RBGs, the virtual index $\{0, 1, \ldots, K-1\}$ can be associated with the RBG indices $\{RBG\_Index(0), RBG\_Index(1), \ldots, RBG\_Index(K-1)\}$.

Embodiment 2.1: RBG Bitmap

This option uses a bitmap to indicate which RBGs are allocated to a UE. The allocated RBGs do not need to be contiguous. For example, a value of 1 indicates that the RBG is allocated to the UE. If the number of total RBs is $N_{RB}$, and the RBG size is P RBs, this requires a bitmap of length $$\left\lceil \frac{N_{RB}}{P} \right\rceil.$$

This is similar as the downlink resource allocation type 0 in LTE.

Embodiment 2.2: RBG Index and Number of RBGs

This option indicates a start RBG index and number of RBGs allocated to a UE. The allocated RBGs are contiguous.

Embodiment 3: Combination of RBG Index and RB Index

The available BGs are divided into multiple RBGs, and each RBG include one or more RBs. The RBG index can be first indicated, and then within the RBG the indices of RBs allocated to a UE can be further indicated.

Figure 28:
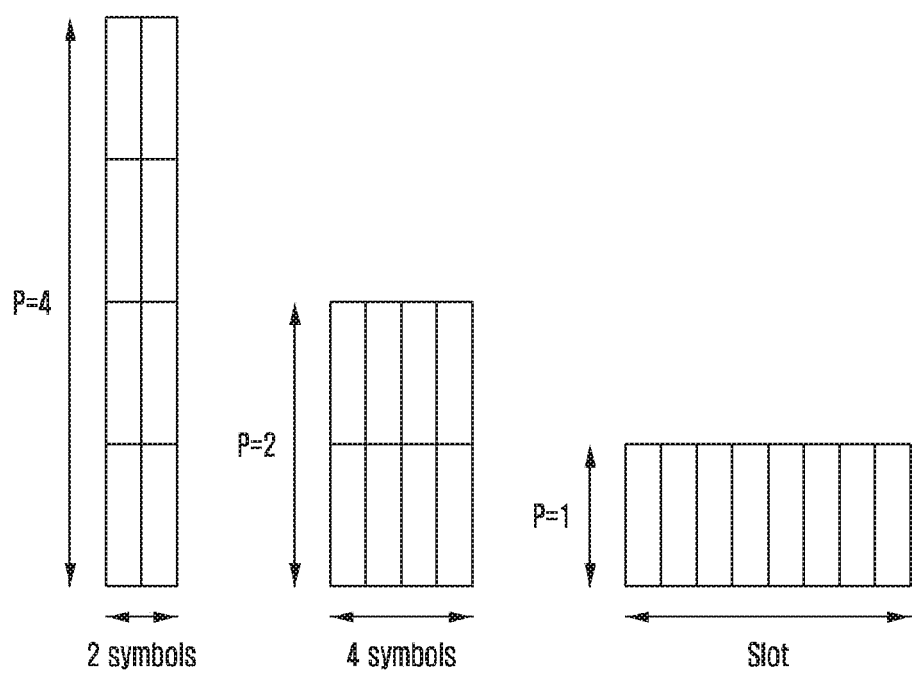
FIG. 28 illustrates an example of different RBG sizes corresponding to different TTIs or transmission duration cases according to an embodiment of the present disclosure.

FIG. 28 illustrates an example of different RBG sizes corresponding to different TTIs or transmission duration cases according to an embodiment of the present disclosure.

Figure 29:
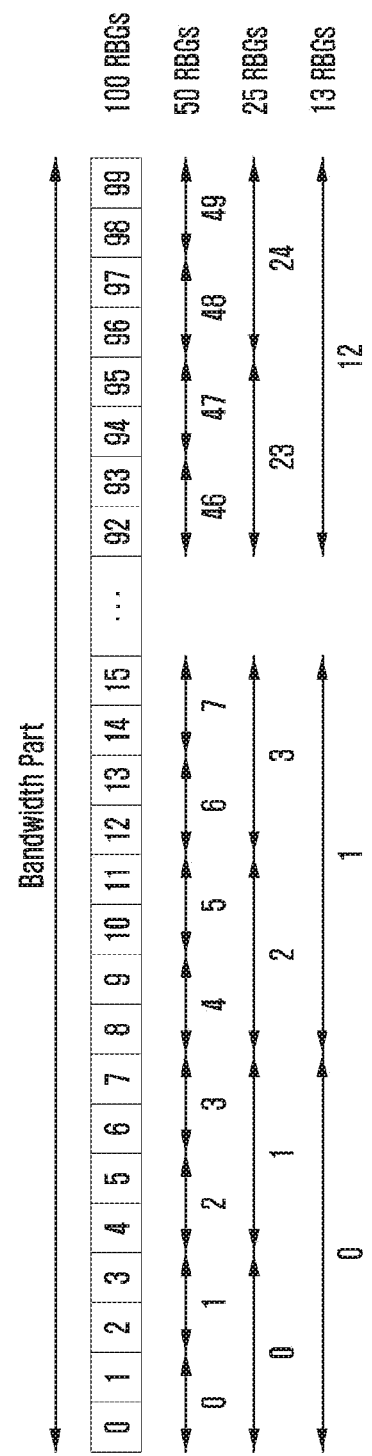
FIG. 29 illustrates an example of different RBG size and different number of RBGs according to an embodiment of the present disclosure.

FIG. 29 illustrates an example of different RBG size and different number of RBGs according to an embodiment of the present disclosure.

The RBG size can be predefined based on a function of the number of RBs in the system bandwidth or the configured bandwidth part. There can be multiple sets of RBG sizes, for different TTI cases, or for different PDCCH monitoring intervals configured by the system. For example, one set can be for the TTI case with 14 symbols, another set for the TTI case with 7 symbols, and one or multiple sets for the TTI case with less than 7 symbols. The candidate RBG sizes can be 1, 2, 4, 8, 16, 32, etc. A reference set can be used to derive the other sets, e.g., by scaling the RBG size. For example, the set of RBG size for TTI with 14 symbols can be the reference set, as denoted by Set 0 in the Table 2. The Set 1 is the set of RBG size for TTI with 7 symbols. The RBG size with the same number of RBs can be simply derived by scaling the number, e.g., 2*P0, where the scalar 2=14/Num_symbol_TTI is from the difference of number of symbols in the time domain. In this way, the RBG can have similar amount of REs in different TTI cases. An example is shown in FIG. 28, where different RBG size corresponds to different TTIs or transmission durations.

TABLE 2

Set of RBG size for different cases

| # of RBs | RBG Size (Set 0) | RBG Size (Set 1) |
| --- | --- | --- |
| <=N0 | P0 | P0' |
| N0 + 1 ~ N1 | P1 | P1' |
| N1 + 1 ~ N2 | P2 | P2' |
| N2 + 1 ~ N3 | P3 | P3' |
| ... | ... | |

Or, a set of pre-defined scaling factors can be used, e.g., 2 times for TTI with 7 symbols, 4 times for TTI with 2 symbols, 8 times for TTI with 1 symbol. Given a pre-defined reference set of RBG size, the scaling factor for calculate the RBG size can be configured for a CORESET, or for certain search space, or for the corresponding DCI format with RBG based resource allocation type. The RBG size is calculated by scaling the reference RBG size in the corresponding RB size by the configured scalar value. Or, the RBG size can be explicitly CORESET, or for certain search space, or for the corresponding DCI format with RBG based resource allocation type. A RBG size can be configured to a UE as a UE-specific configuration.

Figure 30:
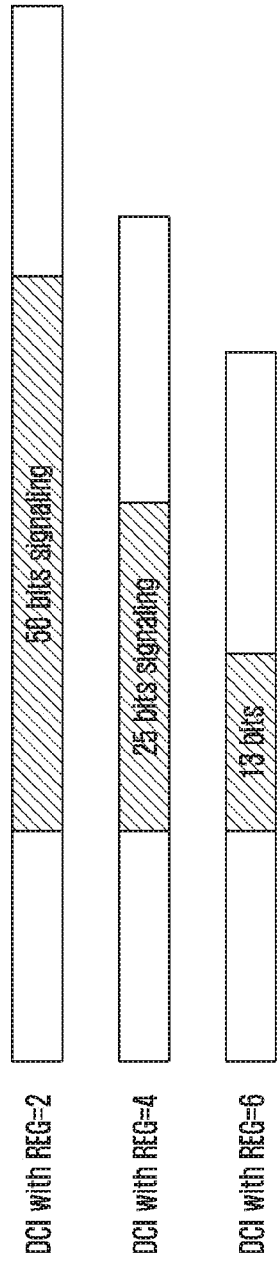
FIG. 30 illustrates an example of different DCI size given different RBG size according to an embodiment of the present disclosure.

FIG. 30 illustrates an example of different DCI size given different RBG size according to an embodiment of the present disclosure.

Referring to FIG. 30, based on the RBG size P which is derived based on a pre-defined rule or configured, as well as the BW for resource allocation, the length of signaling bits corresponding to frequency domain resource allocation can be derived, e.g., $\lceil N_{RB}/P \rceil$, which can be used in the frequency RB assignment field in the DCI. There could be many cases of the signaling bit length depending on the system/BWP parameters, which makes the DCI size variable. To reduce the cases of signaling bit length and hence somewhat limit the cases of DCI sizes; some possible bit lengths of frequency RB assignment field can be pre-defined. If there are multiple pre-defined candidates of bit length for RBG bitmap signaling, e.g., $\{L_0, L_1, L_2, \ldots\}$, the minimum value $L_n$ which is larger than or equal to $\lceil N_{RB}/P \rceil$ can be used as the bitmap signalling. Among the $L_n$ bits, the first $\lceil N_{RB}/P \rceil$ bits (e.g., MSB or LSB) can be used to indicate the RB allocations, and the remaining $L_n - \lceil N_{RB}/P \rceil$ bits can be used as padding bits. The derived length of signaling bits is assumed when UEs try to search a corresponding DCI. In FIG. 29, an example is shown that given a BWP with 100 RBs, a configured RBG size of 2, 4, 8 RBs can provide 50, 25, 13 RBGs respectively. In FIG. 30, an example is shown that the frequency domain resource allocation field in the DCI may be different depending on a configured RBG size and hence different number of RBGs.

Alternatively, if there are multiple pre-defined candidates of bit length for RBG bitmap signaling, e.g., $\{L_0, L_1, L_2, \ldots\}$, the bitmap size can be explicitly configured for a BWP, or for a CORESET, or for certain search space, or for the corresponding DCI format with RBG based resource allocation type. Assume that there are $N_{RB}$ RBs in the configured BWP, and a RBG bitmap size $L_n$ is configured, the minimum candidate RBG size $P_m$ (e.g., among pre-defined RBG size values 2, 4, 8, 16, 32, etc.) which is larger than or equal to $\lceil N_{RB}/L_n \rceil$ can be used as the RBG size. So among the RBG bitmap with configured size $L_n$, the actual bit length for RBG signalling is $\lceil N_{RB}/P_m \rceil$. So, the first $\lceil N_{RB}/P_m \rceil$ bits (e.g., MSB or LSB) can be used to indicate the RB allocations, and the remaining $L_n - \lceil N_{RB}/P_m \rceil$ bits (if there are) can be used as padding bits.

Figure 31:
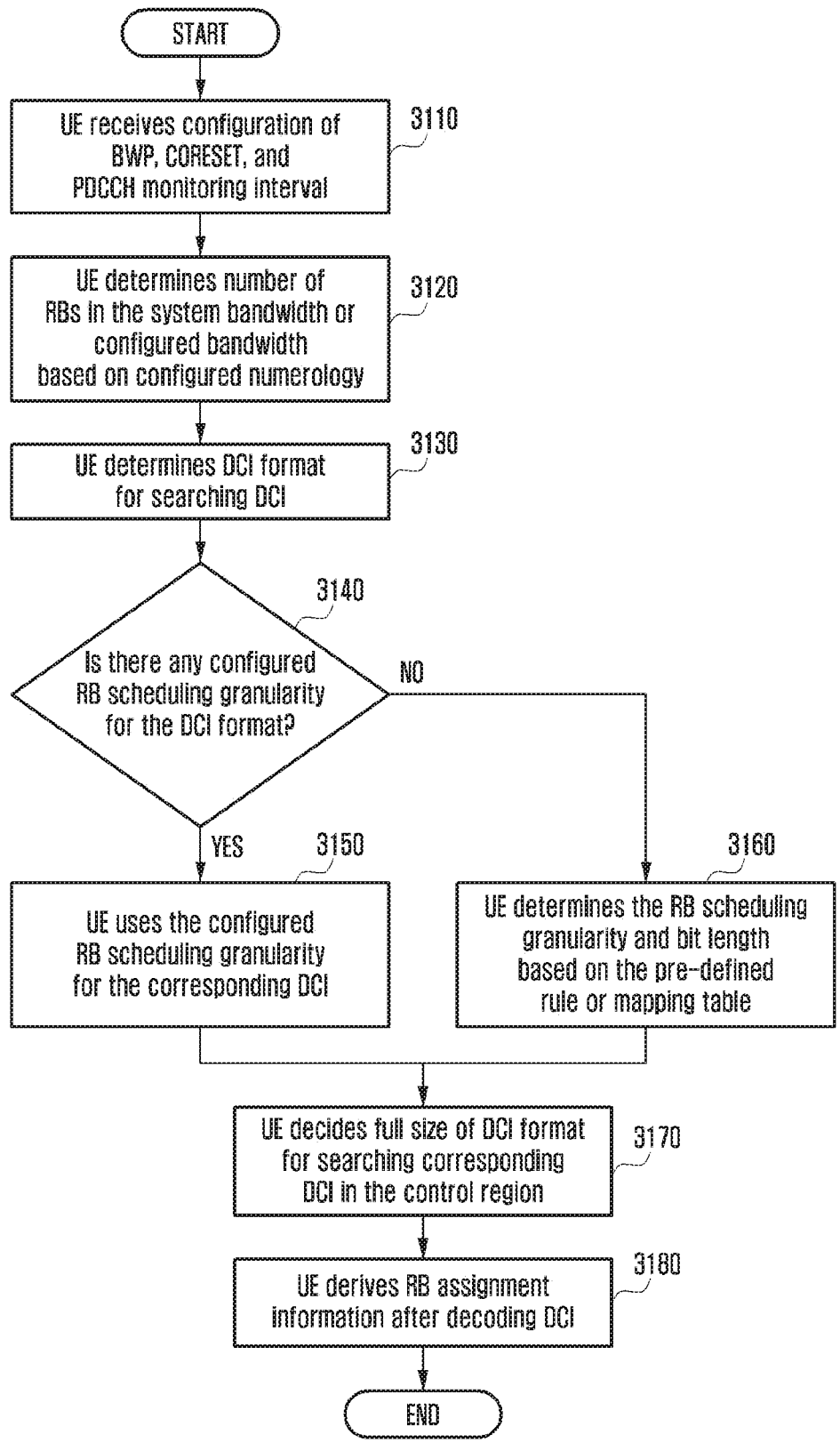
FIG. 31 illustrates a flow chart of UE procedure to determine scheduling granularity and DCI size and resource allocations according to an embodiment of the present disclosure.

FIG. 31 illustrates a flow chart of UE procedure to determine scheduling granularity and DCI size and resource allocations according to an embodiment of the present disclosure.

Referring to FIG. 31, UE receives a configuration of BWP, CORSET, and PDCCH monitoring interval at operation 3110. UE determines the number of RBs in in the system bandwidth or configured bandwidth based on configured numerology at operation 3120. UE determines DCI format for searching DCI at operation 3130. UE determines whether there is any configured RB scheduling granularity for the DCI format at operation 3140. If any, UE uses the configured RB scheduling granularity for the corresponding DCI at operation 3150. Otherwise, UE determines the RB scheduling granularity and bit length based on the pre-defined rule or mapping table at operation 3160. UE decides full size of DCI format for searching corresponding DCI in the control region at operation 3170. UE derives RB assignment information after decoding DCI at operation 3180. The scheduling granularity can be minimum number of RBs ($N_{RB}^{step}$) in the continuous RB allocation with RIV based resource allocation type, or the RBG size in the RBG based resource allocation type. Different resource allocation type may correspond to different DCI format.

Figure 32:
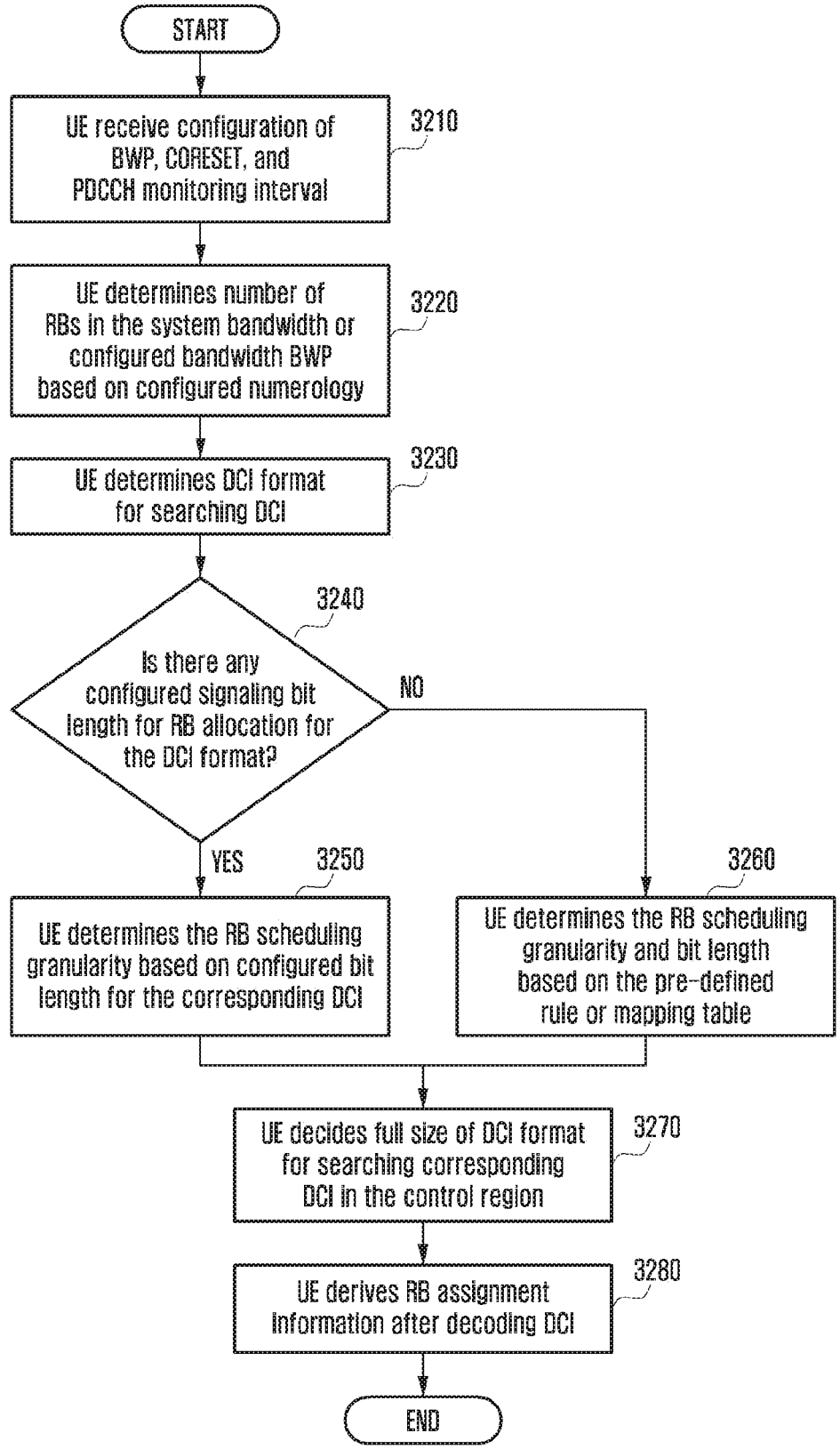
FIG. 32 illustrates another example of UE procedure to determine scheduling granularity and DCI size and resource allocations according to an embodiment of the present disclosure.

FIG. 32 illustrates another example of UE procedure to determine scheduling granularity and DCI size and resource allocations according to an embodiment of the present disclosure.

Referring to FIG. 32, UE receives a configuration of BWP, CORSET, and PDCCH monitoring interval at operation 3210. UE determines the number of RBs in the system bandwidth or configured bandwidth based on configured numerology at operation 3220. UE determines DCI format for searching DCI at operation 3230. UE determines whether there is any configured signaling bit length for RB allocation for the DCI format at operation 3240. If any, UE determines the RB scheduling granularity based on configured bit length for the corresponding DCI at operation 3250. Otherwise, UE determines the RB scheduling granularity and bit length based on the pre-defined rule or mapping table at operation 3260. UE decides full size of DCI format for searching corresponding DCI in the control region at operation 3270. UE derives RB assignment information after decoding DCI at operation 3280. The scheduling granularity can then be determined. The case can be for RIV based resource allocation type, or RBG based resource allocation type. Different resource allocation type may correspond to different DCI format.

3) Scheduling Method

The gNB may send the scheduling grant via DCI to UEs to explicitly indicate the assigned resources in the time and frequency domain. There can be multiple DCI formats with different indication approaches. Based on the received DCI format, the UE derives the allocated time/frequency resource based on the corresponding indication method in the DCI.

In some cases, the allocated resources need to be derived by combining the resource information indicated in DCI and the additional resource indication. The additional resource indication can be signaled in the system information. For example, some resources are pre-configured or reserved for some other services. Even though there is no indication in DCI, the UE may implicitly derive the resource conflict, and avoid using the conflicted resources. Based on a pre-defined rule, the conflicted resources may not be counted in the resource mapping process. Alternatively, the conflicted resources may be counted in the resource mapping process, but not transmitted.

Figure 33A:
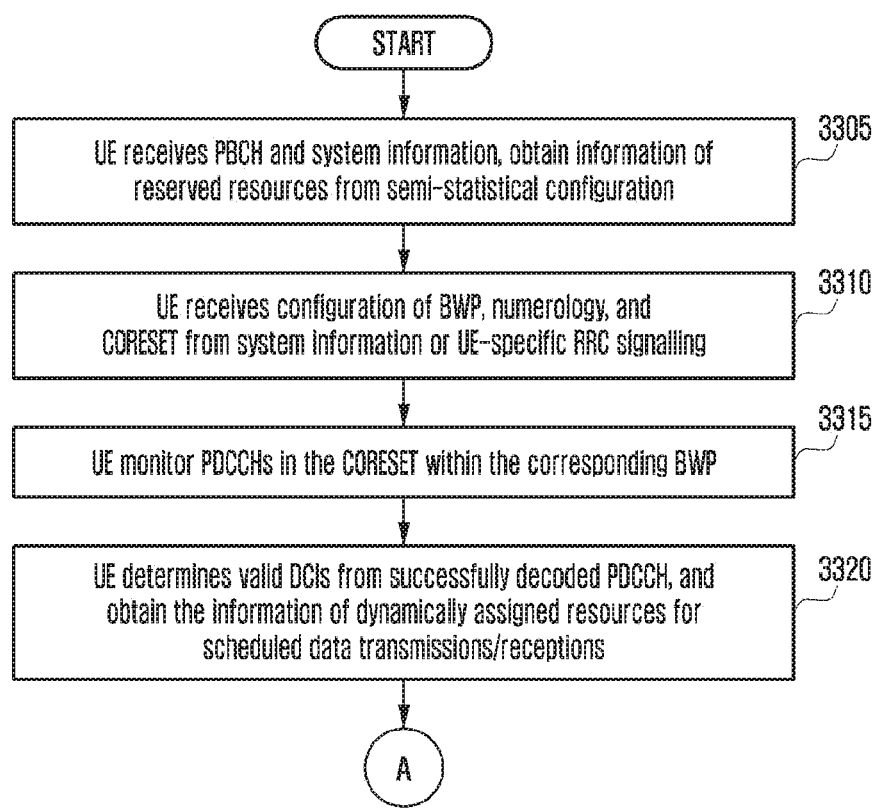
FIGS. 33A and 33B illustrate a UE procedure to determine resource for data transmission and reception based on semi-statically configured resource reservation and dynamic resource allocation according to various embodiments of the present disclosure.
Figure 33B:
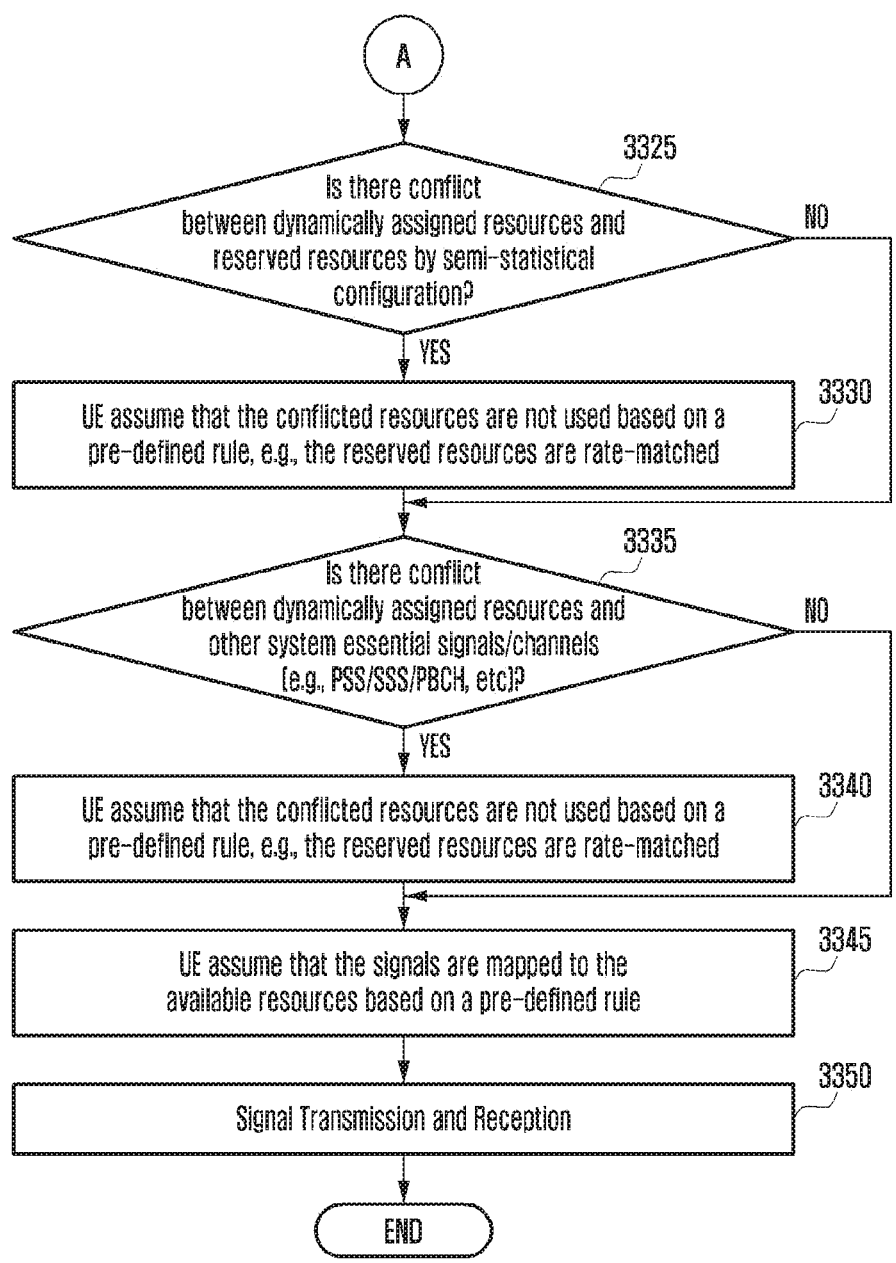

FIGS. 33A and 33B illustrate a UE procedure to determine resource for data transmission and reception based on semi-statically configured resource reservation and dynamic resource allocation according to various embodiments of the present disclosure.

Referring to FIGS. 33A and 33B, UE receives PBCH and system information to obtain information on reserved resources from semi-statistical configuration at operation 3305. UE receives configuration of BWP, numerology, and CORESET from system information or UE-specific RRC signaling at operation 3310. UE monitors PDCCHs in the CORESET within the corresponding BWP at operation 3315. UE determines valid DCIs from successfully decoded PDCCH, and obtain the information on dynamically assigned resources for scheduled data transmissions/receptions at operation 3320. UE determines whether there is conflict between dynamically assigned resources and reserved resources by semi-statistical configuration at operation 3325. If there is conflict between dynamically assigned resources and reserved resources, UE assumes that the conflicted resources are not used based on pre-defined rule, e.g., the reserved resources are rate-matched at operation 3330. Thereafter or if it is determined that there is no conflict between dynamically assigned resources and reserved resources at operation 3325, the procedure proceeds to operation 3335 at which UE determines whether there is conflict between dynamically assigned resources and other system essential signals/channels (e.g. PSS/SSS/PBCH, etc.). If there is conflict between dynamically assigned resources and other system essential signals/channels, UE assumes that the conflicted resources are not used based on a pre-defined rule, e.g. the reserved resources are rate-matched at operation 3340. Thereafter or if it is determined that there is no conflict between dynamically assigned resources and reserved resources at operation 3335, the procedure proceeds to operation 3345 at which UE assumes that the signals are mapped to the available resources based on a pre-defined rule. UE transmits or receives signal at operation 3350.

The additional resource indication can be signaled in the dedicated channel, e.g., in each TTI. A typical case is that the gNB configure the information on resources used for a certain service. The indicated resources need to be precluded for other services. The UE may implicitly derive the resource for its corresponding service and make proper resource usage.

Figure 34:
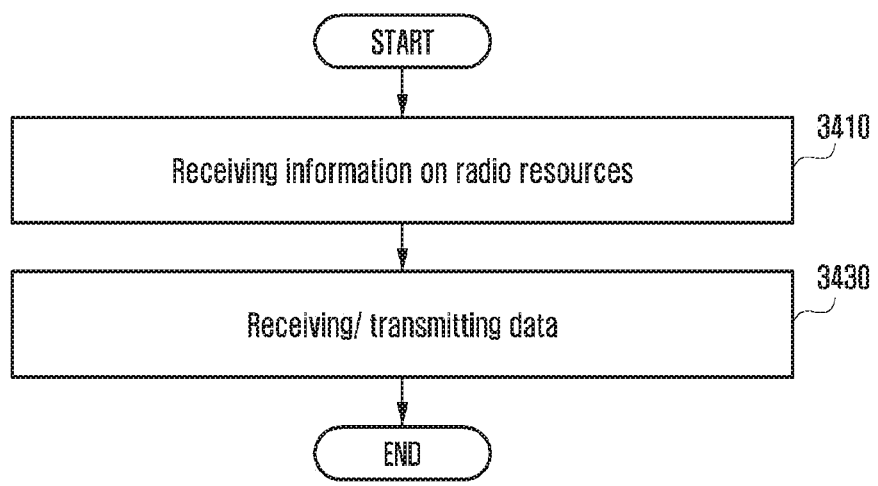
FIG. 34 illustrates a method of a UE for receiving/transmitting data according to an embodiment of the present disclosure.

FIG. 34 illustrates a method of a UE for receiving/transmitting data according to an embodiment of the present disclosure.

Referring to FIG. 34, the UE receives information on radio resources allocated to the UE from a base station at operation 3410. The radio resources are associated with a plurality of symbols in a time domain and a plurality of resource block groups in a frequency domain. The information on the radio resources includes at least one of first information on a starting symbol, or second information on a size of each of the resource block groups. The first information on the starting symbol may include an index of the starting symbol. The index of the starting symbol may indicate one of predefined candidates for the starting symbol. Additionally or alternatively, full symbol bitmap indication, indication of end symbol index, indication of duration of the radio resources associated with the UE, tree based indication of continuously allocated symbols and/or other types of information on resource allocation configuration, which is described in the above embodiments, can be received from the base station. The first information may be transmitted in control information on a downlink control channel or by a higher layer signaling (e.g., RRC signaling). Specifically, the index of the starting symbol may transmitted in DCI on PDCCH, and the information on predefined candidates for the starting symbol may transmitted by RRC signaling. The second information on the size of each of the resource block groups may be transmitted by a higher layer signaling (e.g., RRC signaling). If the UE receives the bitmap indicating the resource block groups that are allocated to the UE, the UE receives from the base station or transmits to the base station based on the second information (i.e., the size of each of the resource block groups).

In addition, the UE may identify duration of the radio resources allocated to the UE. As illustrated FIGS. 16 and 18, the UE may determine whether information on the duration is included in control information received on a downlink control channel. If the information on the duration is not included in the control information, the UE uses the information to identify the duration. If the information on the duration is not included in the control information, the UE determines the duration based on a higher layer signaling (e.g., RRC signaling).

The UE receives from the base station or transmits to the base station data based on the information on the information on the radio resources (e.g., starting symbol, the size of each of the resource block groups, and the duration) at operation 3420.

Figure 35:
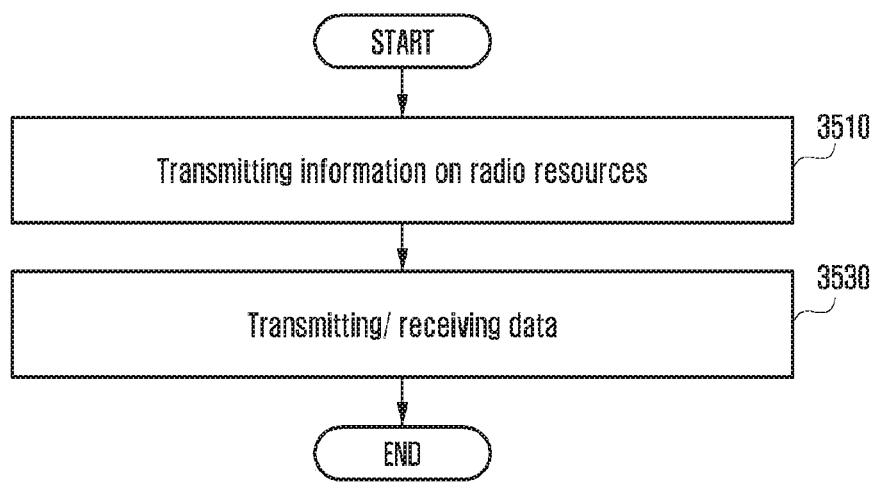
FIG. 35 illustrates a method of a base station for receiving/transmitting data according to an embodiment of the present disclosure.

FIG. 35 illustrates a method of a base station for receiving/transmitting data according to an embodiment of the present disclosure.

Referring to FIG. 35, the base station transmits, to a UE, information on radio resources allocated to the UE at operation 3510. The information on the radio resources includes at least one of first information on a starting symbol, or second information on a size of each of the resource block groups. In addition, the base station may transmit information on duration of the radio resources allocated to the UE. The first information on the starting symbol may include an index of the starting symbol. The index of the starting symbol may indicate one of predefined candidates for the starting symbol. The information on the duration of the radio resources allocated to the UE may be transmitted in control information on a downlink control channel or by a higher layer signaling (e.g., RRC signaling). The base station transmits to the UE or receives from the UE data based on the information on the radio resources allocated to the UE at operation 3520.

Figure 36:
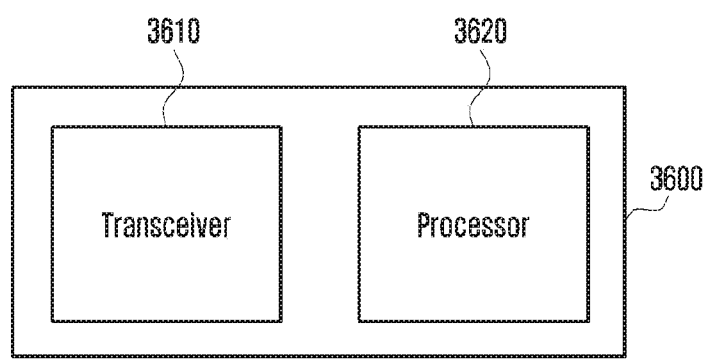
FIG. 36 is a block diagram of a UE in a cellular network according to an embodiment of the present disclosure.

FIG. 36 is a block diagram of a UE in a cellular network according to an embodiment of the present disclosure.

Referring to FIG. 36, the UE (3600) includes a transceiver (3610) and a processor (3620). The transceiver (3610) and the processor (3620) are configured to perform the steps of the method illustrated in FIGS. 16, 18, 26, 31, 32, 33, 33A, 33B and 34, or the operations of a UE described above. For example, the transceiver (3610) may be configured to receive signals from a base station and transmit signals to the base station, and the processor (3620) may be configured to control the transceiver (3610) to receive information on radio resources allocated to the UE (3600), and control the transceiver (3610) to receive data based on the information on the radio resources. In addition, the processor (3620) may be configured to identify duration of the radio resources allocated to the UE (3600).

Figure 37:
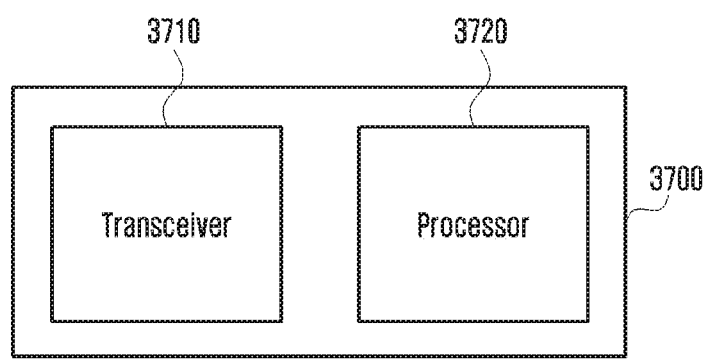
FIG. 37 is a block diagram of a base station in a cellular network according to an embodiment of the present disclosure.

FIG. 37 is a block diagram of a base station in a cellular network according to an embodiment of the present disclosure.

Referring to FIG. 37, the base station (3700) includes a transceiver (3710) and a processor (3720). The transceiver (3710) and the processor (3720) are configured to perform the steps of the method illustrated in FIG. 35 or the operations of a gNB described above. For example, the transceiver (3710) may be configured to receive signals from a UE and transmit signals to the UE, and the processor (3720) may be configured to control the transceiver (3710) to transmit information on radio resources allocated to the UE, and control the transceiver (3710) to transmit data based on the information on the radio resources allocated to the UE. In addition, the processor (3720) may be configured to transmit information on duration of the radio resources allocated to the UE.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a terminal for receiving data in a wireless communication system, the method comprising:
identifying a number of resource blocks (RBs) in a bandwidth part configured for a terminal;
identifying a resource block group (RBG) size based on an RBG size configuration and the number of RBs in the bandwidth part, wherein the RBG size configuration is configured for the terminal among at least two RBG size configurations;
identifying a plurality of RBGs in the bandwidth part based on the RBG size;
receiving, from a base station, downlink control information including information on frequency domain resource allocation;
identifying at least one RBG allocated to the terminal among the plurality of RBGs based on the information on frequency domain resource allocation; and
receiving, from the base station, downlink data on the at least one RBG.

2. The method of claim 1, wherein the downlink control information further includes information on time domain resource allocation indicating one of a plurality of candidate configurations, each candidate configuration including information on a starting symbol of consecutive symbols allocated to the terminal and a number of the consecutive symbols counting from the starting symbol.

3. The method of claim 1, further comprising:
receiving, from the base station, configuration information including a symbol level bitmap in time domain, the symbol level bitmap indicating whether a corresponding symbol is available for downlink data transmission.

4. A method performed by a base station for transmitting data in a wireless communication system, the method comprising:
identifying a number of resource blocks (RBs) in a bandwidth part configured for a terminal;
identifying a resource block group (RBG) size based on an RBG size configuration and the number of RBs in the bandwidth part, wherein the RBG size configuration is configured for the terminal among at least two RBG size configurations;
identifying a plurality of RBGs in the bandwidth part based on the RBG size;
allocating at least one RBG among the plurality of RBGs to the terminal;
transmitting, to the terminal, downlink control information including information on frequency domain resource allocation, the information on frequency domain resource allocation indicating the at least one RBG among the plurality of RBGs; and
transmitting, to the terminal, downlink data on the at least one RBG.

5. The method of claim 4, wherein the downlink control information further includes information on time domain resource allocation indicating one of a plurality of candidate configurations, each candidate configuration including information on a starting symbol of consecutive symbols allocated to the terminal and a number of the consecutive symbols counting from the starting symbol.

6. The method of claim 4, further comprising:
transmitting, to the terminal, configuration information including a symbol level bitmap in time domain, the symbol level bitmap indicating whether a corresponding symbol is available for downlink data transmission.

7. A terminal in a wireless communication system, the terminal comprising:
a transceiver; and
at least one processor coupled with the transceiver and configured to:
identify a number of resource blocks (RBs) in a bandwidth part configured for a terminal,
identify a resource block group (RBG) size based on an RBG size configuration and the number of RBs in the bandwidth part, wherein the RBG size configuration is configured for the terminal among at least two RBG size configurations,
identify a plurality of RBGs in the bandwidth part based on the RBG size, receive, from a base station via the transceiver, downlink control information including information on frequency domain resource allocation, identify at least one RBG allocated to the terminal among the plurality of RBGs based on the information on frequency domain resource allocation, and receive, from the base station via the transceiver, downlink data on the at least one RBG.

8. The terminal of claim 7, wherein the downlink control information further includes information on time domain resource allocation indicating one of a plurality of candidate configurations, each candidate configuration including information on a starting symbol of consecutive symbols allocated to the terminal and a number of the consecutive symbols counting from the starting symbol.

9. The terminal of claim 7, wherein the at least one processor is further configured to receive, from the base station via the transceiver, configuration information including a symbol level bitmap in time domain, the symbol level bitmap indicating whether a corresponding symbol is available for downlink data transmission.

10. A base station in a wireless communication system, the base station comprising:

a transceiver; and at least one processor coupled with the transceiver and configured to:

identify a number of resource blocks (RBs) in a bandwidth part configured for a terminal, identify a resource block group (RBG) size based on an RBG size configuration and the number of RBs in the bandwidth part, wherein the RBG size configuration is configured for the terminal among at least two RBG size configurations, identify a plurality of RBGs in the bandwidth part based on the RBG size, allocate at least one RBG among the plurality of RBGs to the terminal, transmit, to the terminal via the transceiver, downlink control information including information on frequency domain resource allocation, the information on frequency domain resource allocation indicating the at least one RBG among the plurality of RBGs, and transmit, to the terminal via the transceiver, downlink data on the at least one RBG.

11. The base station of claim 10, wherein the downlink control information further includes information on time domain resource allocation indicating one of a plurality of candidate configurations, each candidate configuration including information on a starting symbol of consecutive symbols allocated to the terminal and a number of the consecutive symbols counting from the starting symbol.

12. The base station of claim 10, wherein the at least one processor is further configured to transmit, to the terminal via the transceiver, configuration information including a symbol level bitmap in time domain, the symbol level bitmap indicating whether a corresponding symbol is available for downlink data transmission.

* * * * *